(12) United States Patent
Dobashi et al.

(10) Patent No.: US 6,882,741 B2
(45) Date of Patent: Apr. 19, 2005

(54) FACIAL IMAGE RECOGNITION APPARATUS

(75) Inventors: Hironori Dobashi, Tokyo (JP); Toshio Hirasawa, Kawasaki (JP); Akio Okazaki, Yokohama (JP); Toshio Sato, Yokohama (JP); Hiroshi Sukegawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 666 days.

(21) Appl. No.: 09/814,012

(22) Filed: Mar. 22, 2001

(65) Prior Publication Data

US 2001/0031072 A1 Oct. 18, 2001

(30) Foreign Application Priority Data

Mar. 22, 2000 (JP) ........................................ 2000-080702
Mar. 22, 2000 (JP) ........................................ 2000-080703
Nov. 1, 2000 (JP) ........................................ 2000-334977

(51) Int. Cl.[7] .............................................. G06K 9/00
(52) U.S. Cl. ................................................ 382/118
(58) Field of Search ........................ 382/117–118, 190, 382/305, 312; 348/77, 155

(56) References Cited

U.S. PATENT DOCUMENTS

| | | | | |
|---|---|---|---|---|
| 4,641,349 A | * | 2/1987 | Flom et al. ................. | 382/117 |
| 5,572,596 A | * | 11/1996 | Wildes et al. ............... | 382/117 |
| 6,055,322 A | * | 4/2000 | Salganicoff et al. ........ | 382/117 |
| 6,108,437 A | * | 8/2000 | Lin ............................ | 382/118 |
| 6,181,805 B1 | * | 1/2001 | Koike et al. ................ | 382/118 |
| 6,181,806 B1 | * | 1/2001 | Kado et al. ................. | 382/118 |
| 6,516,247 B2 | * | 2/2003 | Funada ....................... | 700/245 |
| 6,628,811 B1 | * | 9/2003 | Nagao et al. ............... | 382/118 |
| 6,701,026 B1 | * | 3/2004 | Zheng et al. ............... | 382/274 |
| 6,718,050 B1 | * | 4/2004 | Yamamoto .................. | 382/117 |
| 2003/0206645 A1 | | 11/2003 | Okazaki et al. | |

FOREIGN PATENT DOCUMENTS

| | | |
|---|---|---|
| JP | 7-312711 | 11/1995 |
| JP | 10-134188 | 5/1998 |
| JP | 11-167632 | 6/1999 |
| JP | 11-175718 | 7/1999 |
| JP | 11-191856 | 7/1999 |
| JP | 11-316836 | 11/1999 |

OTHER PUBLICATIONS

Yamaguchi et al., "Face recognition using temporal image sequence," Proceedings of the Third International Conference on Automatic Face and Gesture Recognition, 1998, pp. 318–323.
Fukui et al., "Facial Feature Point Extraction Method Based on Combination of Shape Extraction and Pattern Matching," Systems and Computers in Japan, vol. 29, No. 6, 1998, pp. 49–58.
"Der elektronische Pförtner: Automatisches Erkennen und Identifizeren von menschlichen Geisichtern," Bichsel et al., Paul Scherrer Institute c/o Laboratories RCA Ltd., Sep. 24, 1990, pp. 106–113.
Patent Abstracts of Japan, "Image Pickup Method," Daisuke, Publication No. 61118884, Publication Date Jun. 1986.

* cited by examiner

Primary Examiner—Kanjibhai Patel
(74) Attorney, Agent, or Firm—Pillsbury Winthrop, LLP

(57) ABSTRACT

A first illumination section radiates light at a certain degree of illuminance toward the face of a human recognition object from an upper right part or an upper left part of a camera, and a second illumination section radiates light at a certain degree of illuminance toward the face of the human recognition object from a lower part of a camera. The camera photographs and inputs a facial image of the human recognition object. The image processing section extracts a feature value of the face of the human recognition object from a facial image inputted by the camera and collates the feature value extracted with a standard feature value registered in advance so as to recognize a facial image of the human recognition object.

18 Claims, 18 Drawing Sheets

A CASE OF NORMAL PHOTOGRAPHING

A CASE OF PHOTOGRAPHING A FACE TILTED

COOL WHITE AND DAYLIGHT
FLUORESCENT LAMP

THREE WAVELENGTHS
FLUORESCENT LAMP

FACIAL IMAGE RECOGNITION APPARATUS

CROSS-REFERENCE TO RELATED APPLICATIONS

This application is based upon and claims the benefit of priority from the prior Japanese Patent Applications No. 2000-080702, filed Mar. 22, 2000; No. 2000-080703, filed Mar. 22, 2000; and No. 2000-334977, filed Nov. 1, 2000, the entire contents of all of which are incorporated herein by reference.

BACKGROUND OF THE INVENTION

The present invention relates to a facial image recognition apparatus recognizing a facial image of a person, for example, in a security management or the like and a pass control apparatus controlling the pass of a passenger, employing this facial image recognition apparatus.

With respect to conventional facial image recognition apparatuses, recognition rates are deteriorated in some cases when the facial image of a human recognition object is photographed under the influence of outer light such as indoor illumination and solar light. In order to reduce such deterioration in the recognition rate due to the influence of the outer light, following techniques have been proposed in conventional facial image recognition apparatuses.

For example, Jpn. Pat. Appln. KOKAI Publication No. 11-316836 discloses a technique in which the illumination condition of a time of image pickup is made constant by installing a lighting apparatus in an upper part of the apparatus and controlling the light quantity and the radiation direction of the lighting apparatus.

However, in the technique disclosed in Jpn. Pat. Appln. KOKAI Publication No. 11-316836, it is necessary to provide a control circuit to control the quantity of light for all illumination conditions. Further, in the technique disclosed in Jpn. Pat. Appln. KOKAI Publication No. 11-316836, it is necessary to newly provide a drive circuit to drive the lighting apparatus in order to control illumination angle of the light at several levels. Thus, since it is necessary to newly provide a control circuit for controlling the quantity of light or a drive circuit for driving a lighting apparatus in the technique disclosed in Jpn. Pat. Appln. KOKAI Publication No. 11-316836, there is a problem that the device becomes complex and the cost of the device is increased.

Jpn. Pat. Appln. KOKAI Publication No. 11-175718 discloses a technique in which information previously registered is updated at a time of a change in an illumination condition in order to restraint changes in an illumination condition (changes in properties with year or time). However, in the technique disclosed in Jpn. Pat. Appln. KOKAI Publication No. 11-175718, since it is necessary to update registered information at the time of a change in an illumination condition, there is a problem that an encumbrance for a user increases.

Jpn. Pat. Appln. KOKAI Publication No. 11-167632 discloses a technique in which a facial image is registered again when a recognition rate is deteriorated. However, in the technique disclosed in Jpn. Pat. Appln. KOKAI Publication No. 11-167632, since registration is performed again when the recognition rate is deteriorated, for example, it is necessary for a person of a human recognition object or the like who changes his/her hair style daily to update registered information every recognition time. Consequently, there is a problem that convenience for a user is deteriorated.

Jpn. Pat. Appln. KOKAI Publication No. 11-316836 discloses a technique in which the direction of an image pickup camera is changed when the direction of the human recognition object at a recognition time differs from the direction of the person previously registered. In the technique disclosed in Jpn. Pat. Appln. KOKAI Publication No. 11-316836, needed is a drive device changing the direction of the image pickup camera when the direction of the human recognition object at a recognition time differs from the direction of the person previously registered. Thus, there is a problem that the structure of the apparatus becomes complex or the cost of the apparatus increases.

Jpn. Pat. Appln. KOKAI Publication No. 11-191856 discloses a technique in which a sight line guiding device guiding a line of sight in the apparatus is provided. However, in the technique disclosed in Jpn. Pat. Appln. KOKAI Publication No. 11-191856, it is necessary to newly provide a control circuit controlling the direction of the image pickup camera and the sight line guiding device in order to provide the sight line guiding device guiding a line of sight on the device. Thus, there is a problem that the structure of the apparatus becomes complex or the cost of the apparatus increases.

In some cases in conventional facial image recognition apparatuses, the recognition rates are deteriorated when photographing conditions such as distance and direction of a person are not constant. For example, in a facial image recognition apparatus, when a person inputs a facial image in a condition of stand-up posture, it is necessary to grapple with a problem for height differences among shorter height persons and taller height persons in order to capture a facial image under a condition where a right front face of a person is photographed or an approximately front face is photographed. Thus, following techniques have been proposed in order to make photographing conditions such as distance and direction of a person constant in conventional facial image recognition apparatuses.

Jpn. Pat. Appln. KOKAI Publication No. H10-134188 discloses a technique to make a person photographing condition constant by two cameras. That is, in Jpn. Pat. Appln. KOKAI Publication No. H10-134188, two cameras are arranged vertically. A taller height person photographs his facial image by a camera arranged in an upper position. A shorter height person photographs his facial image by a camera arranged in a lower position.

However, in the technique disclosed in Jpn. Pat. Appln. KOKAI Publication No. 10-134188, at least two cameras are necessary in order to obtain a facial image in a state wherein a person is standing in order not to encumber the person. Thus, in the technique disclosed in Jpn. Pat. Appln. KOKAI Publication No. 10-134188, extra needed is one image input system such as a camera, an image capture circuit, and a control circuit, compared with a case where only one camera is employed. Further, in the technique disclosed in Jpn. Pat. Appln. KOKAI Publication No. 10-134188, needed is a means selecting one camera in whose visual field a facial image exists, whereby a problem arises that the apparatus structure becomes very complex.

Jpn. Pat. Appln. KOKAI Publication No. 7-312711 discloses a technique in which a photographing condition is made constant only by one camera. That is, Jpn. Pat. Appln. KOKAI Publication No. 7-312711 discloses a technique in which a descending slope in which a floor face descends gradually toward a camera direction is provided so that the apparatus is set so that the head to be photographed automatically enters to the photographing area of a camera.

However, in the technique disclosed in Jpn. Pat. Appln. KOKAI Publication No. 7-312711, since it is assumed that a facial image is obtained while movement is made without encumbering a person, following problems arise.

First, in the technique disclosed in Jpn. Pat. Appln. KOKAI Publication No. 7-312711, it is necessary to previously input height information obtained by a card reader before a facial image is inputted. Thus, in the technique disclosed in Jpn. Pat. Appln. KOKAI Publication No. 7-312711, processing at the time of registering a facial image becomes complex.

In the technique disclosed in Jpn. Pat. Appln. KOKAI Publication No. 7-312711, a photographing position set for each human object who has a distinct height is detected by an operation condition of a plurality of optical sensors provided in an upper side part of the slope. Thus, in the technique disclosed in Jpn. Pat. Appln. KOKAI Publication No. 7-312711, plural optical sensors are necessary, and also a high accuracy is needed for positioning based on a detection result of each optical sensor.

In the technique disclosed in Jpn. Pat. Appln. KOKAI Publication No. 7-312711, for example, a visual attention mark emitting blue light to an upper front part of a human photographing object is employed for a sight line guide for the human photographing object. However, in the technique disclosed in Jpn. Pat. Appln. KOKAI Publication No. 7-312711, when face recognition is performed, in a case where a human recognition object is known in advance, the sight line guide only by the visual attention mark is difficult to be recognized.

Further, Jpn. Pat. Appln. KOKAI Publication No. 7-312711 does not describe a method regarding a case where a human recognition object is stopped so that recognition of a facial image is performed.

BRIEF SUMMARY OF THE INVENTION

It is an object of the present invention to provide a facial image recognition apparatus and a pass control apparatus by which deterioration in the recognition rate due to illumination fluctuation in a ceiling illumination or the like can be reduced so that a high accuracy facial image recognition becomes possible.

It is an object of the present invention to provide a facial image recognition apparatus and a pass control apparatus by which deterioration in the recognition rate due to a difference in the angle of a light radiating illumination to the face of a human recognition object or the size of a facial image can be reduced so that a high accuracy facial image recognition becomes possible.

It is an object of the present invention to provide a facial image recognition apparatus and a pass control apparatus by which acquisition of a facial image becomes easy regardless of the height of a human recognition object, and a facial image of a state wherein a human recognition object stands still which is conventionally difficult to be acquired merely by one camera can be easily acquired.

It is an object of the present invention to provide a facial image recognition apparatus and a pass control apparatus by which the influence of the outer light due to solar light can be eliminated and the influence of the outer light due to an indoor illumination lamp can be eliminated.

A facial image recognition apparatus of the present invention comprises a plurality of illuminations radiating light toward the face of a human recognition object, a camera for photographing a facial image of the human recognition object toward which the light from the plurality of illuminations is radiated, a feature value extraction section for extracting a feature value of the face of the human recognition object from a facial image photographed by the camera, and a recognition section for collating the feature value extracted by the feature value extraction section with a standard feature value registered in advance so as to recognize a facial image of the human recognition object.

A facial image recognition apparatus of the present invention comprises a facial image registration section for performing registration processing of a facial image and a facial image recognition section connected to the facial image registration section to perform recognition processing of a facial image. The facial image registration section comprises a plurality of first illuminations radiating light toward the face of a human registration object, a first camera for photographing a facial image of the human registration object, a first feature value extraction section for extracting a feature value of the face of the human registration object from a facial image photographed by the first camera, and a memory section for storing a feature value extracted by the first feature value extraction section as a standard feature value. The facial image recognition section comprises a plurality of second illuminations radiating light toward the face of a human recognition object, a second camera for photographing a facial image of the human recognition object, a second feature value extraction section for extracting a feature value of the face of the human recognition object from a facial image photographed by the second camera, and a recognition section for collating a feature value extracted by the second feature value extraction section with a feature value stored in the memory section of the facial image registration section so as to recognize a facial image of the human recognition object.

A pass control apparatus of the present invention comprises a plurality of illuminations radiating light toward the face of the passenger, a camera for photographing a facial image of the passenger toward which the light from the plurality of illuminations is radiated, a feature value extraction section for extracting a feature value of the face of the passenger from a facial image photographed by the camera, a recognition section for collating the feature value extracted by the feature value extraction section with a standard feature value registered in advance so as to recognize a facial image of the passenger, and a pass control section for controlling a pass of the passenger according to a recognition result by the recognition section.

A pass control apparatus of the present invention comprises a facial image registration section for performing registration processing of a facial image and a facial image recognition section connected to the facial image registration section to perform recognition processing of a facial image. The facial image registration section comprises a plurality of first illuminations radiating light toward the face of a human registration object, a first camera for photographing a facial image of the human registration object, a first feature value extraction section for extracting a feature value of the face of the human registration object from a facial image photographed by the first camera, and a memory section for storing a feature value extracted by the first feature value extraction section as a standard feature value. The facial image recognition section comprises a plurality of second illuminations radiating light toward the face of the passenger, a second camera for photographing a facial image of the passenger, a second feature value extraction section for extracting a feature value of the face of the passenger from a facial image photographed by the second camera, a recognition section for collating a feature value extracted by the second feature value extraction section with a feature value stored in the memory section of the facial image registration section so as to recognize a facial image of the passenger, and a pass control section for controlling a pass of the passenger according to a recognition result by the recognition section.

A facial image recognition apparatus of the present invention comprises a camera installed so that a human recognition object positions oneself on a floor face having at least one or more differences in elevation and photographing a facial image of the human recognition object positioning oneself on a floor face of a height according to the height of the human recognition object, a display section for displaying a facial image of the human recognition object photographed by the camera, a feature value extraction section for extracting a feature value of the face of the human recognition object from a facial image photographed by the camera, and a recognition section for collating the feature value extracted by the feature value extraction section with a standard feature value registered in advance so as to recognize a facial image of the human recognition object.

A pass control apparatus of the present invention comprises a camera installed so that the passenger positions oneself on a floor face having at least one or more differences in elevation and photographing a facial image of the passenger positioning oneself on a floor face of a height according to the height of the passenger, a display section for displaying a facial image of the passenger photographed by the camera, a feature value extraction section for extracting a feature value of the face of the passenger from a facial image photographed by the camera, a recognition section for collating the feature value extracted by the feature value extraction section with a standard feature value registered in advance so as to recognize a facial image of the passenger, and a pass control section for controlling a pass of the passenger according to a recognition result by the recognition section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Each embodiment of the present invention is explained below, referring to drawings.

First, a first embodiment is explained.

Figure 1:
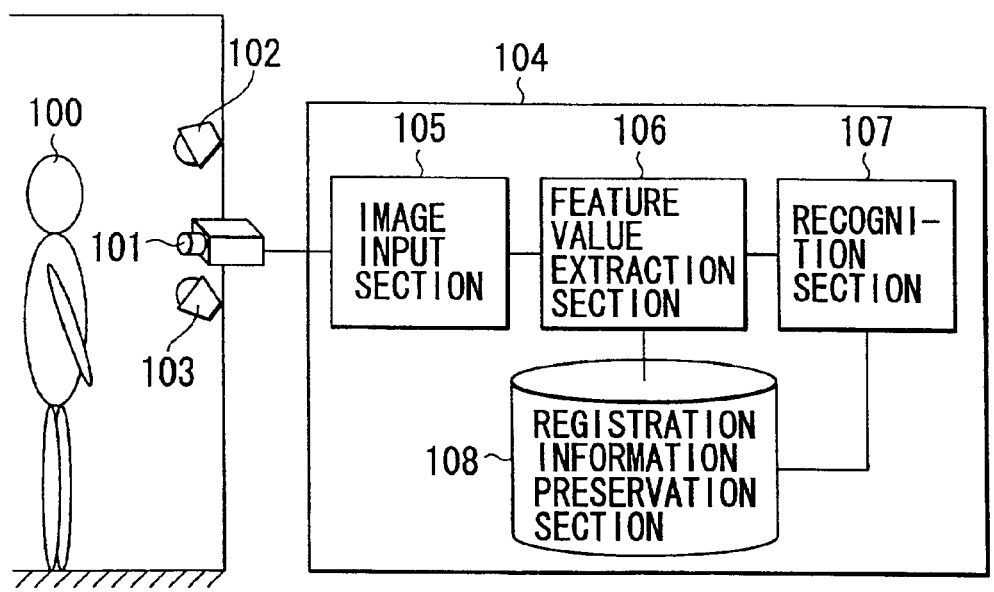
FIG. 1 is a block diagram schematically showing the structure of a facial image recognition apparatus according to a first embodiment.

FIG. 1 schematically shows the structure of a facial image recognition apparatus according to the first embodiment of the present invention. This facial image recognition apparatus has a camera 101, a first illumination section 102, a second illumination section 103, and an image processing section 104.

The camera 101 photographs and inputs a facial image of a human recognition object 100. This camera 101 is the one photographing and inputting a facial image of the human recognition object 100. The camera 101 is composed, for example, of a television camera employing an image pickup element such as a CCD sensor.

The first illumination section (first illumination) 102 radiates light at a certain illuminance from a right upper part or a left upper part of the camera 101 to the face of the human recognition object 100. This first illumination section 102 is a lighting apparatus such as a fluorescent lamp radiating light at a certain illuminance from a right upper part or a left upper part of the camera 101 to the face of the human recognition object 100. The second illumination section (second illumination) 103 radiates light at a certain illuminance from a lower part of the camera 101 to the face of the human recognition object 100. The image processing section 104 processes a facial image inputted from the camera 101 to perform recognition processing and the like.

Figure 2:
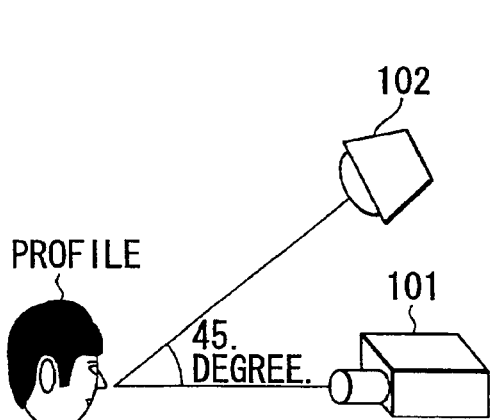
FIG. 2 is a side view showing the relationship between a first illumination section and a camera.
Figure 3:
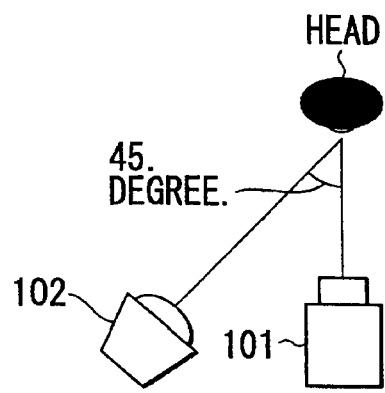
FIG. 3 is a top view showing the relationship between the first illumination section and the camera.

The first illumination section 102 is installed with respect to the camera 101 as shown in FIG. 2 and FIG. 3. In FIG. 2 and FIG. 3, the angle formed between the optical axis of the light emitted from the first illumination section 102 (the optical axis of the first illumination section 102) and the optical axis of the light through which the camera 102 photographs (the optical axis of the camera 101) is 45.degree. The camera 101 can be installed, for example, under a condition that the angle formed between the optical axis of the first illumination section 102 and the optical axis of the camera 101 is 30.degree. or less.

Figure 4:
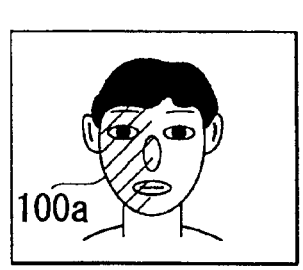
FIG. 4 is a drawing showing an example of a facial image by means of the first illumination section.

The first illumination section 102 radiates a direct light to the face of the human recognition object 100 so that a shadow due to parts of the face (a nose, an eye, and the like) is formed in one side, the half, of the face (shaded portion 100a in the drawing) as shown in FIG. 4. The first illumination section 102 may be one emitting not a direct light but a diffused light or an indirect light. Even when the light from the first illumination section 102 is not a direct light but a diffused light or an indirect light, as far as the shadow is formed in one side, the half, of the face, the effect due to the first illumination section 102 is not changed at all.

Figure 5:
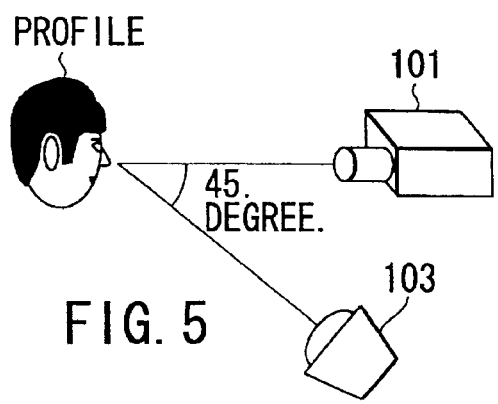
FIG. 5 is a side view showing the relationship between a second illumination section and a camera.

The second illumination section 103 is a lighting apparatus such as a fluorescent lamp radiating light at a certain illuminance from a lower part of the camera 101 to the face of the human recognition object 100 as shown in FIG. 5. In FIG. 5, the second illumination section 103 is installed so that the angle formed between the optical axis of the second illumination section 103 and the optical axis of the camera 101 becomes 45.degree. The second illumination section 103 may be installed, for example, under a condition that the angle formed between the optical axis of the second illumination section 103 and the optical axis of the camera is from 30 to 60.degree.

The second illumination section 103 can be any as far as it can radiates a direct light to the face of the human recognition object 100. The second illumination section may be one emitting not a direct light but a diffused light or an indirect light, and must be one emitting the same type of light as that of the first illumination section 102.

Further, the relationship between the illuminance 1A of the first illumination section 102 and the illuminance 2A of the second illumination section 103 must satisfy the following equation (1).

$$1A \geq 2A \tag{1}$$

By these two illumination sections (the first illumination section 102, the second illumination section 103), a shadow is formed on a facial image of the human recognition object 100. Thus, through two illumination sections, the shadow manifested on the facial image strongly represents an unevenness of the face. When the unevenness of the face is strongly manifested by the shadow manifested on the facial image, an individual difference in the facial image is emphasized and the recognition rate of a facial image is improved.

The illuminance of the first illumination 102 is set stronger than that of the second illumination 103 due to the above equation (1). Thus, the light from the first illumination section 102 more influences the shadow formed on the facial image of the human recognition object 100 than the light from the second illumination 103 does. The light from the second illumination section 103 has an effect to ease the influence of the light from the first illumination section 102. Thus, the light from the second illumination section 103 acts so that the light from the first illumination section 102 does not form too much shadows on the face of the human recognition object 100.

Only with the first illumination section 102, when the distance between the human recognition object 100 and the camera 101 is different, the way in which the shadow on the facial image is formed differs. Thus, when the distance between the human recognition object 100 and the camera 101 at the time of recognizing a facial image and the distance between the human recognition object 100 and the camera 101 at the time of registering a facial image are different, the recognition rate of the facial image decreases.

On the contrary, with the first illumination section 102 and the second illumination section 103, even when the distance between the human recognition object 100 and the camera 101 is different, deterioration in the recognition rate of the facial image is reduced. This is because the difference in shadows formed on facial images becomes small due to a subtle difference between the illuminance of the first illumination section 102 and the illuminance of the second illumination section 103 even when the distance between the human recognition object 100 and the camera 101 at the recognition time of a facial image and the distance between the human recognition object 100 and the camera 101 at the registration time of a facial image are different. That is, as far as the illuminance 1A of the first illumination section 102 and the illuminance 2A of the second illumination section 103 lie in a predetermined relationship, the influence of the outer light can be reduced.

For example, where the illuminance of the first illumination section 102 is 1A, the illuminance of the second illumination section 103 is 2A, the total value of 1A and 2A is B (1×), and the illuminance of the outer light is C (1×), when the relationship of $$1A+2A=B>C \tag{2}$$

holds valid, the influence of the outer light can be reduced. The illuminance B (1×) due to the total of the first illumination section 102 and the second illumination section 103 is prescribed within a range in which a facial image inputted does not become in a saturated state.

Here, the outer light is light other than the light from the first illumination section 102 and the light from the second illumination section 103 and is light radiated to the human recognition object 100. For example, inside a room, a ceiling illumination (a fluorescent light, an incandescent lamp, or the like) in a rear upper part of the human recognition object 100 corresponds to the outer light. In the outdoor or in the vicinity of a window, solar light or the like may correspond to the outer light.

In the present embodiment, although it is supposed that the first illumination section 102 and the second illumination section 103 are constantly lighted, the first illumination section 102 and the second illumination section 103 may be lighted only when the human recognition object 100 approaches the present apparatus. This case can be realized by sensing whether or not a human recognition object 100 approaches the present apparatus and turning on the first illumination section 102 and the second illumination section 103. In order to detect the approach of a human being to the present apparatus, for example, a human sensor such as an infrared sensor is separately provided. By analyzing an input image from the camera 101, it becomes possible to detect the approach of a human being to the present apparatus.

Next, the image processing section 104 is explained. For example, the image processing section 104 can be realized by a computer. The image processing section 104 has a memory device (not shown) such as a hard disk drive, a CD (compact disc) drive, an MD (mini disc) drive, or an FD (floppy disc) drive. In the memory device, a program by which the image forming section 104 performs image processing is stored.

In the following explanation, described is each set of information of image input data, feature value extracted, a subspace, an eigenvector for constructing a subspace, a correlation matrix, status information of time, date, place, and the like of a registration, individual information such as a code number or an ID code. In the following explanation, recognition data contains the subspace or the eigenvector for constructing the subspace. In the following explanation, registration information contains image input data, feature value extracted, a subspace, an eigenvector for constructing a subspace, a correlation matrix, status information, and individual information. Thus, recognition data are included in the registration information.

A specific structural example of the image processing section 104 is explained below in detail referring to FIG. 1. The image processing section 104 has an image input section 105, a feature value extraction section 106, a recognition section 107, and a registration information preservation section (registration section) 108. The registration information preservation section 108 is the one in which a standard feature value is registered (stored) in advance.

The image input section 105 inputs a facial image from the camera 101, performs A/D conversion to digitalize it, and then sends it to the feature value extraction section 106.

Figure 6:
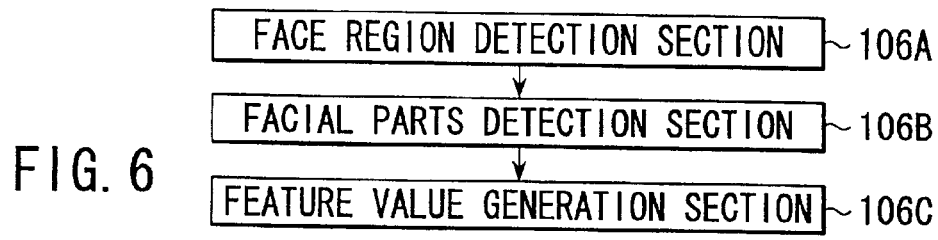
FIG. 6 is a block diagram schematically showing the structure of a feature value extraction section.

The feature value extraction section 106 extracts a feature value such as intensity information or subspace information, employing a facial image of the human recognition object 100 obtained from the image input section 105. FIG. 6 is a diagram showing a structural example of the feature value extraction section 106. As shown in FIG. 6, the feature value extraction section 106 has a facial region detection section 106A, a facial parts detection section 106B, and a feature value generation section 106C.

The feature value extraction section 106 is explained in detail below.

The facial region detection section (facial region detection means) 106A detects a facial region from a facial image inputted at the camera 101. In a detection method of the facial region that the facial region detection section 106A performs, for example, while making a movement in an image with a template prepared in advance, a correlation value is sought so that the place having the highest correlation value is determined as a face region. The detection method of a facial region that the facial region detection section 106A performs may be a method such as a facial region extraction method utilizing an eigenspace method or a subspace method besides the method described above.

The facial parts detection section 106B detects positions of eyes and a nose from the part of the facial region detected. As the detection method that the facial parts detection section 106B performs, for example, employed is a publicly known method described in the literature (Kazuhiro Fukui and Osamu Yamaguchi, "Facial feature point extraction by the combination of shape extraction and pattern matching," Journal of the Institute of Electronics, Information and Communication Engineers (D), vol. J80-D-II, No. 8, pp. 2170–2177 (1997)) or the like.

The feature value generation section 106C cuts out the facial region at certain size and shape based on the positions of the facial parts detected to generate a feature value. Here, for example, an intensity value of an m pixel by n pixel region is employed as information as it is, and information of m×n dimension is employed as a feature vector.

The recognition section 107 performs recognition processing of a facial image based on the feature value generated by the feature value generation section 106C. In the recognition section 107, when a mutual subspace method is employed as a recognition method, the feature value is generated by the following procedure. The mutual subspace method is a publicly known recognition method described, for example, in the literature, (Osamu Yamaguchi, Kazuhiro Fukui, and Ken-ichi Maeda: "Face recognition system using temporal image sequence," THE INSTITUTE OF ELECTRONICS, INFORMATION AND COMMUNICATION ENGINEERS, TECHNICAL REPORT OF IEICE, PRMU97-50, pp. 17–24 (1997-06).

When the mutual subspace method is employed as a recognition method, the recognition section 107 calculates the m×n dimensional information as a feature vector and then seeks a correlation matrix of the feature vector (or a covariance matrix) to seek a normalized orthogonal vector (an eigenvector) by its K-L expansion so as to calculate a subspace. The calculated subspace selects k eigenvectors corresponding to an eigenvalue in the order of being large in the eigenvalues and is represented employing its eigenvector set.

In the present embodiment, correlation matrix Cd is sought from a feature vector and is diagonalized with a correlation matrix $$Cd = \Phi d \Lambda d \Phi d^T$$

to seek a matrix $\Phi$ of an eigenvector. For example, an input image is processed by the feature value extraction section 106 to obtain time series facial image data, and from these image data a correlation matrix of a feature vector is sought to seek a normalized orthogonal vector by the K-L expansion so as to calculate a subspace. This calculated subspace is utilized as a recognition dictionary for performing identification of a person. This recognition dictionary is formed, for example, by registering a subinterval of the person to be a recognition object calculated in advance in the memory device.

As described later on, the subspace itself may be treated as input data for performing recognition. Therefore, a calculation result of the subspace that is a feature value of the time of employing the mutual subspace method as a recognition method is sent to the recognition section 107 and the registration information preservation section 108.

The recognition section 107 collates (compares) recognition data (subspace) stored in the registration information preservation section 108 with the feature value obtained in the feature value extraction section 106. Thus, the recognition section 107 recognizes who is the human recognition object 100 photographed in the camera 101 or identifies whether or not he is a corresponding person.

For example, recognition processing of a facial image is utilized for a case (recognition operation) where recognition of a corresponding person is performed from registered persons or a case (identification operation) where whether or not the person is himself is confirmed when individual information such as a card, a registration number, a code number, a key, or the like is utilized.

When a corresponding person is recognized from registered persons, recognition processing (recognition operation) of a facial image can be done by seeking which person's data is most similar in registered persons. Accordingly, in order to recognize the corresponding person from the registered persons, a person corresponding to the recognition data having maximum degree of similarity with respect to the actually photographed facial image may be the recognition result.

In a case where whether or not the person is himself is confirmed when individual information such as a card, a registration number, a code number, or a key is utilized, it is decided whether or not it is similar more than a predetermined degree of similarity, compared to recognition data corresponding to individual information such as a card or number of each person in the recognition processing (identification operation) of a facial image. Thus, in order to confirm whether or not the person is himself at the time of utilizing individual information, the degree of similarity between the actually photographed facial image and the recognition data corresponding to individual information registered in advance is calculated, and when this calculated degree of similarity exceeds a threshold value set in advance, he is determined as himself.

As a recognition method that the recognition section 107 performs, the subspace method, a compound similarity degree method, a mutual subspace method, and the like are employed as described above.

Next, the mutual subspace method is explained. In this method, both the recognition data in the registration information stored in advance and the inputted data are represented as subspaces, and the "angle" formed by the two subspaces is defined as the degree of similarity. Here, a subspace inputted is called an input subspace.

A correlation matrix Cin is sought with respect to input data rows and is diagonalized with a correlation matrix $$Cin = \Phi in \Lambda in \Phi in^T$$

to seek an eigenvector $\Phi in$. A subspace similarity degree (0.0 to 1.0) of a subspace represented by two $\Phi in$ and $\Phi d$ is sought and is assumed as a degree of similarity for performing recognition.

Figure 7:
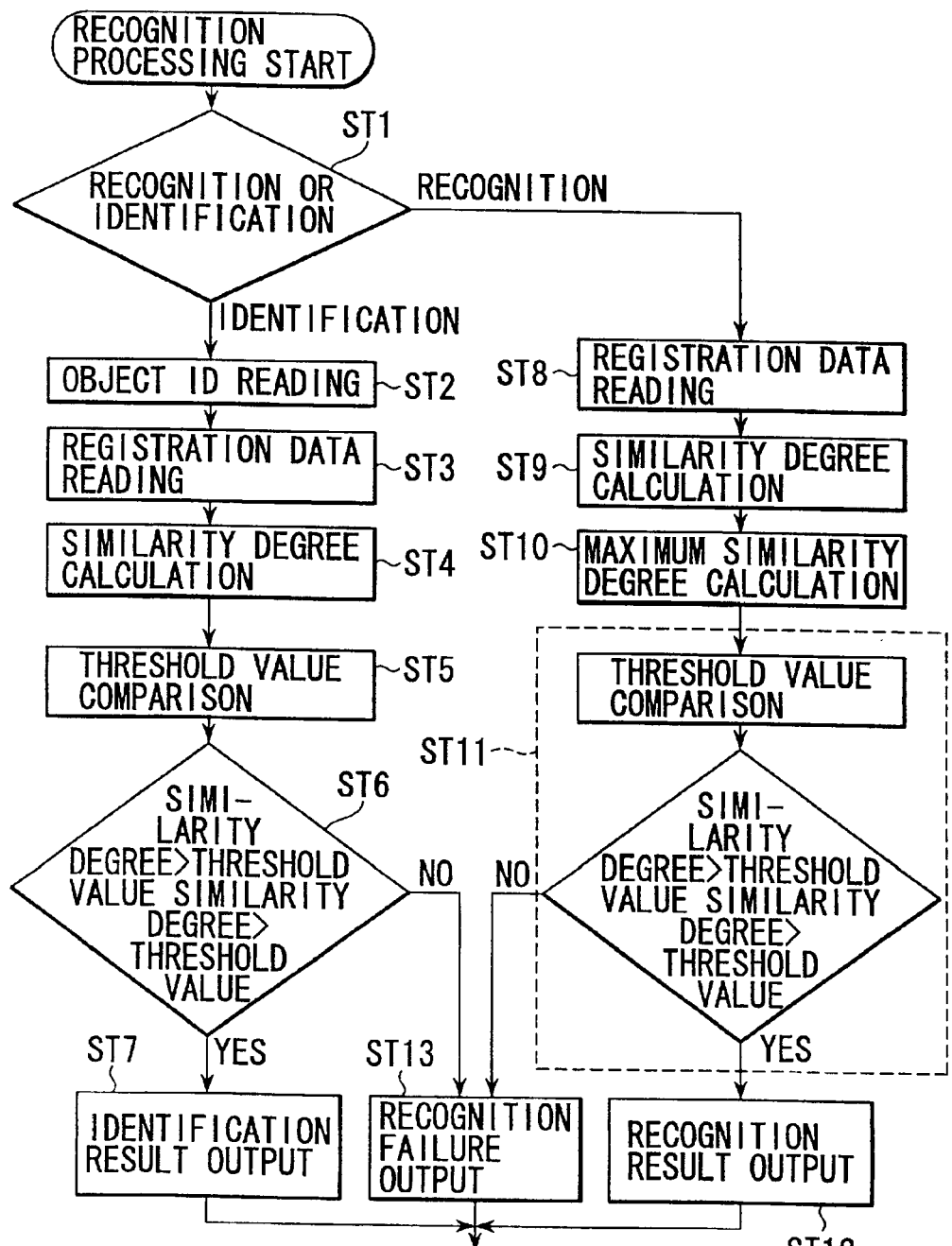
FIG. 7 is a flow chart for explaining the recognition process of a recognition section.

The recognition section 107 operates as the flow chart shown in FIG. 7. First, operation of the recognition section 107 differs depending on whether the recognition section 107 performs the recognition operation or the identification operation (ST1). When the identification operation is performed (ST1, identification), the recognition section 107 first reads the ID code of a human recognition object to be an object (ST2). The recognition section 107 then reads the registration information (subspace) corresponding to the ID code to be the object from the registration information preservation section 108 (ST3).

Then, as described above, in order to perform recognition by the subspace method or the like, the recognition section 107 calculates the degree of similarity between subspaces of each set of registration data and an input vector (eigenvector from the feature value extraction section 106) or an input subspace (ST4). The recognition section 107 then compares the degree of similarity with a threshold value set in advance (ST5).

As a result of this comparison, when the degree of similarity calculated is decided to be greater than the threshold value (ST6, YES), the recognition section 107 decides that it is the one (identification) and outputs that the person is confirmed as a result (ST7). When the degree of similarity calculated is decided not to be greater than the threshold value (ST6, NO), the recognition section 107 decides that it is not the one (no identification) and outputs that the person is not confirmed as a result (ST7).

When recognition operation is performed (ST1, recognition), the recognition section 107 reads all the data to be the recognition object from the registration information preservation section 108 (ST8). Then, the recognition section 107 calculates the degree of similarity with each set of registration data (ST9). The recognition section 107 then decides the maximum among the calculated degrees of similarities (ST10). After deciding registration data of the maximum similarity degree by that decision, the recognition section 107 outputs the person corresponding to the registration data of the maximum similarity degree decided as a recognition result (ST12).

As step ST11 shown in broken lines in FIG. 7, by comparing the maximum similarity degree with the threshold value set in advance, it is possible even to inspect whether or not the recognition result is correct (ST13). For example, when the degree of similarity is lower than the threshold value set in advance, it is also possible for the recognition section 107 to decide that any recognition objects who have been already registered do not correspond.

The registration information preservation section 108 can accumulate subspaces utilized for identifying human recognition objects (or correlation matrixes or the like), status information such as time, date, place, or the like of the time of the registration, and the like. Image input data and a feature value extracted may also be accumulated. In this case, the registration information preservation section 108 holds not only a subspace but also a correlation matrix of a previous step for calculating a subspace.

The registration information preservation section 108 may hold plural sets of recognition data corresponding to one person or an ID code. In this case, the subspace is stored along with supplementary information such as its acquired time. As a reason to hold the plural sets of recognition data, given is simultaneously supplying a plurality of subspaces corresponding to one person to the recognition section 107 and recognizing them.

In a case where a drastic change occurs, for example, in a case where the person wears or takes off a pair of glasses, two sets of recognition data are prepared, and when either set of data are identified, collation can be made. This can be applied to cases of not only glasses but also makeup or no makeup for a woman or the like. Thus, encumbrance on a user such as the case where one has to take glasses off to be authenticated is alleviated.

Next, a second embodiment is explained.

Figure 8:
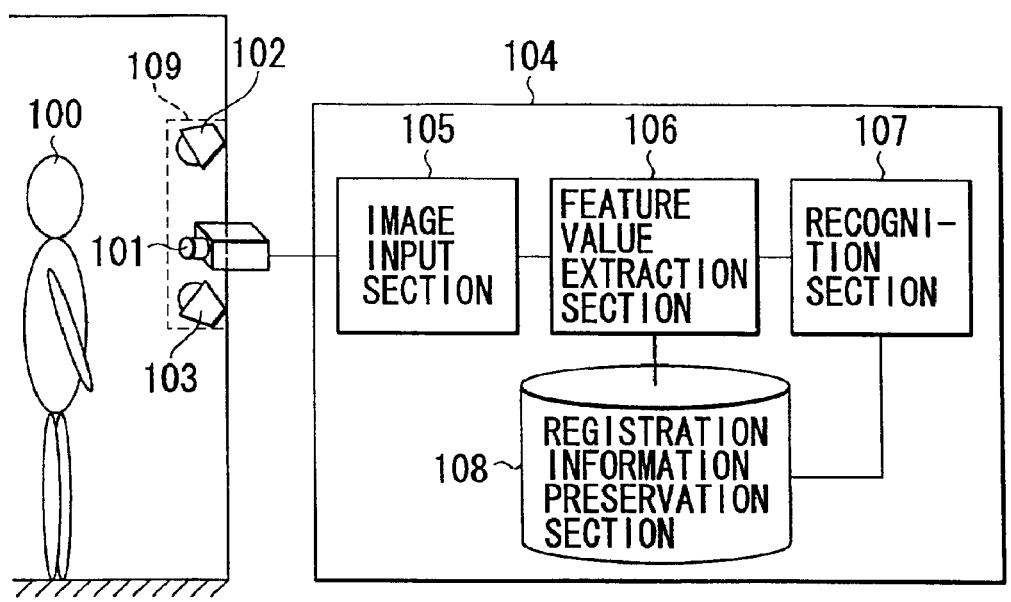
FIG. 8 is a block diagram schematically showing the structure of a facial image recognition apparatus according to a second embodiment.

FIG. 8 schematically shows the structure of a facial image recognition apparatus according to the second embodiment of the present invention. This facial image recognition apparatus has a camera 101, a first illumination section 102, a second illumination section 103, an image processing section 104, and a light interruption section 109 as an outer light interruption means interrupting the light from a horizontal direction such as solar light.

The camera 101, the first illumination section 102, the second illumination section 103, and the image processing section 104 have the same structures as those of the first embodiment described above and have the same operations. Thus, explanation for the same structures as those of the first embodiment described above are omitted. The outer light interruption section 109 is explained below.

Figure 9:
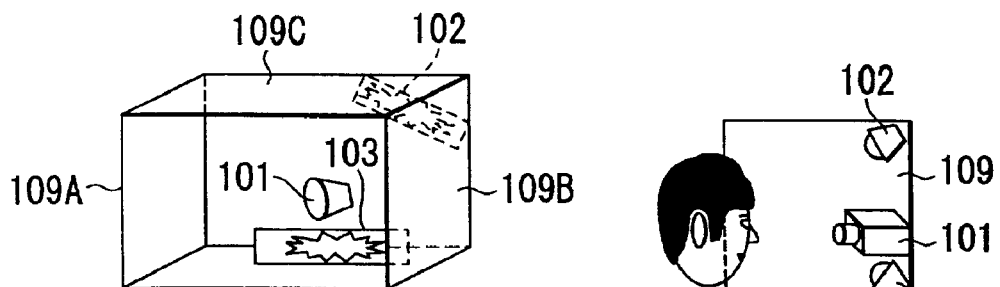
FIG. 9 is a perspective view showing the relationship among an outer light interruption section, the first illumination section, and the second illumination section.

The outer light interruption section 109 interrupts the outer light radiated from a horizontal direction of the face of the human recognition object 100 such as solar light or from an upper part. The outer light interruption section 109 encloses, for example, the periphery of the camera 101 and the illumination sections 102, 103 by two faces of both sides (109A, 109B) and one face of an upper side (109C), totally three faces, as shown in FIG. 9.

The height of the outer light interruption section 109 corresponds to that from the upper side of the first illumination section 102 to the lower side of the second illumination section 103. The height of the outer light interruption section 109 may have at least a vertical length of the face of the human recognition object 100 or more as shown in FIG. 9. The breadth of the outer light interruption section 109 may have a horizontal length of the face of the human recognition object 100 or more.

Figure 10:
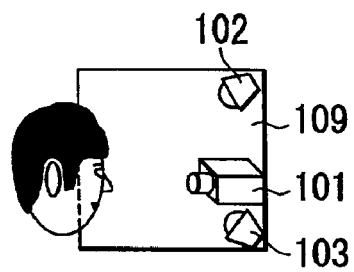
FIG. 10 is a side view showing the relationship among the outer light interruption section, the first illumination section, and the second illumination section.

The depth of the outer light interruption section 109 may have a distance calculated from a lens focal length of the camera 101 and the size of an image pickup element, that is, from about a depth by which the front surface of the face of the human recognition object 100 is covered as shown in FIG. 10.

In this second embodiment, although a quadrangular enclosure as the outer light interruption section 109 is shown as an example, its effect does not change at all even if it is a circular enclosure.

Thus, by interrupting the outer light, a stable illumination environment can be realized, and a high accuracy recognition of a facial image in which fluctuation in the recognition rate is little becomes possible.

Next, a third embodiment is explained.

Figure 11:
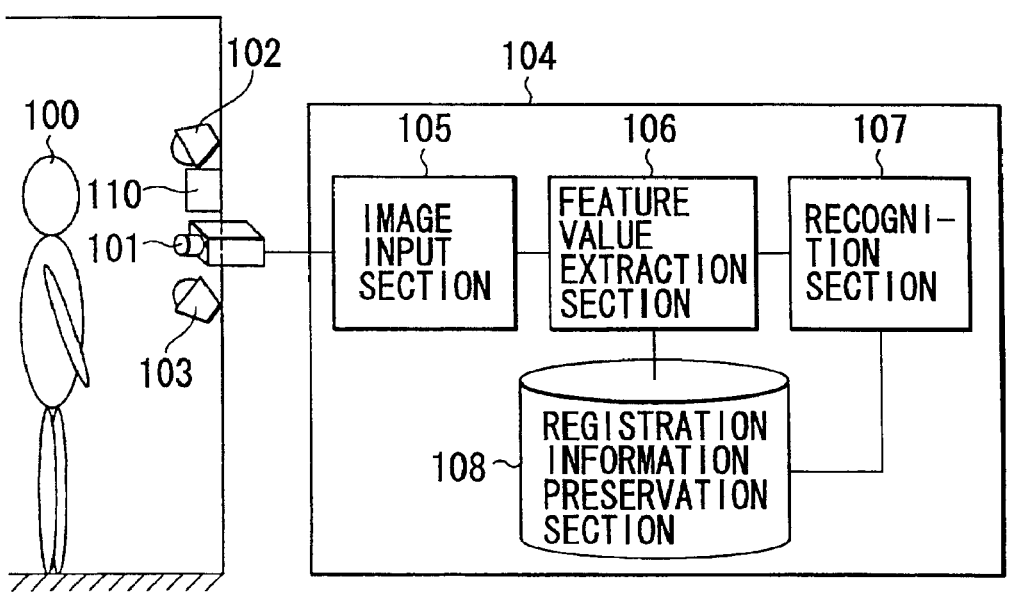
FIG. 11 is a block diagram schematically showing the structure of a facial image recognition apparatus according to a third embodiment.

FIG. 11 schematically shows the structure of a facial image recognition apparatus according to the third embodiment of the present invention. This facial image recognition apparatus has a camera 101, a first illumination section 102, a second illumination section 103, an image processing section 104, and a display section 110 as a display means displaying a facial image of the human recognition object 100 photographed.

The camera 101, the first illumination section 102, the second illumination section 103, and the image processing section 104 have the same structures as those of the first embodiment described above and have the same operations. Thus, explanation about the same structures as those of the first embodiment described above are omitted, and the display section 110 is explained below.

Figure 12:
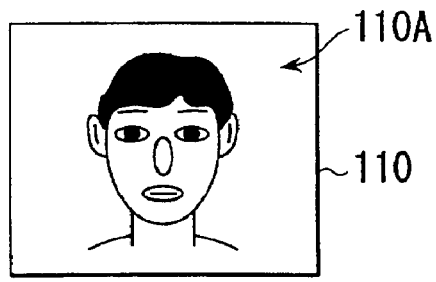
FIG. 12 is a drawing showing a display example of a facial image of a case where photographing is normally performed.
Figure 13:
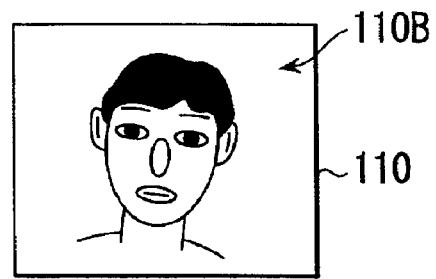
FIG. 13 is a drawing showing a display example of a facial image of a case where a face is photographed in a tilted manner.

FIG. 12 and FIG. 13 are drawings showing examples of facial images of a person displayed in the display section 110. FIG. 12 is a drawing showing a display screen 110A in a case where a normal photographing is performed, and FIG. 13 is a drawing showing an example of a display screen 110B in a case where the face is photographed in a tilted manner.

The display section 110 displays a dynamic image of the face of the person photographed as shown in FIG. 12 and FIG. 13. By these types of displays, the human recognition object 100 can confirm whether or not his own facial image is correctly photographed.

Figure 14:
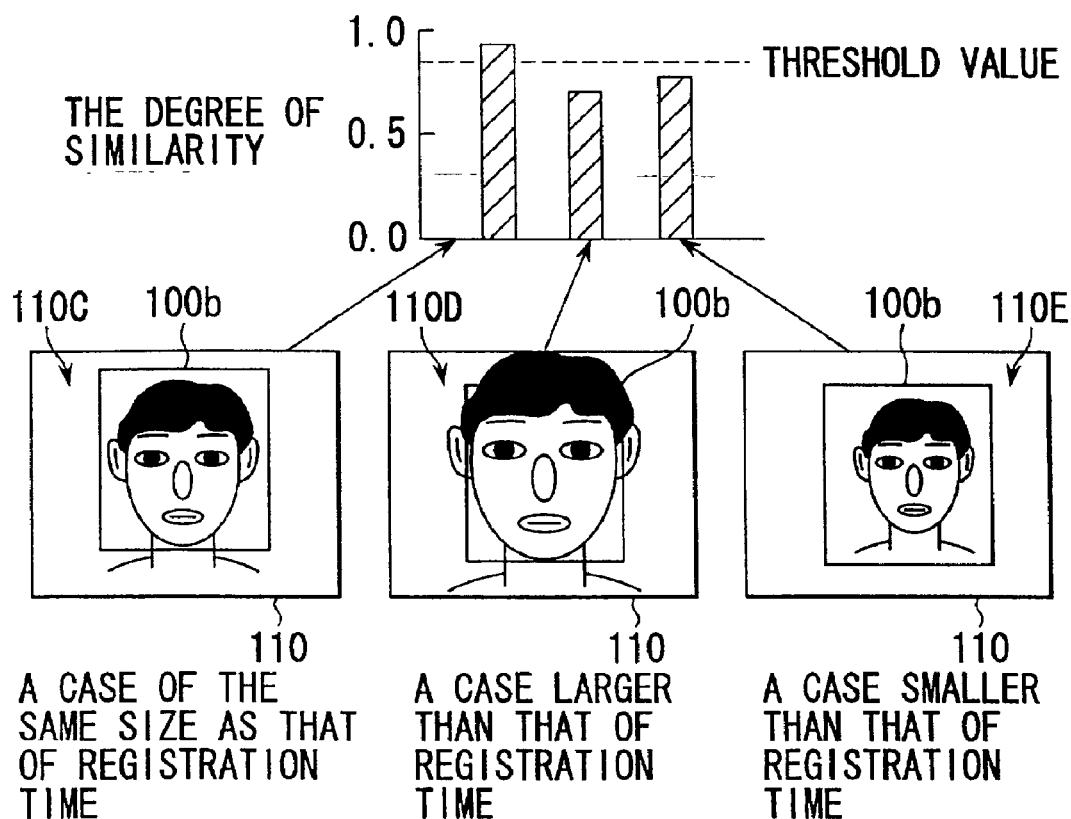
FIG. 14 is drawings showing display examples of facial images on the basis of differences in the sizes of facial images.

FIG. 14 is drawings showing the relationship between the facial images of the person displayed in the display section 110 and the degree of similarity. FIG. 14 shows display screens 110C, 110D, 110E as display examples of facial images. In FIG. 14, the size of the facial image at the time of the registration is represented by a quadrangular frame 100b on the screens 110C, 110D, 110E. This quadrangular frame 100b is set by calculating a positional relationship between the camera 101 and the human recognition object 100 at the time of the registration based on the facial image of the human recognition object 100 registered.

The display screen 110C shows a state wherein a facial image with the same size as that of the time of the registration is displayed. The display screen 110D shows a state wherein a facial image larger than that of the time of the registration is displayed. The display screen 110E shows a state wherein a facial image smaller than that of the time of the registration is displayed.

As shown in the display screen 110C of FIG. 14, when a facial image of the same size as that of the time of the registration is photographed, the degree of similarity becomes high and is the predetermined threshold value or more. However, as shown in the display screen 110D of FIG. 14, when a facial image is photographed to be larger than that of the time of the registration, the degree of similarity becomes low and thus is the predetermined threshold value or below. As shown in the display screen 110E of FIG. 14, when a facial image is photographed to be smaller than that of the time of the registration, the degree of similarity becomes low and thus is the predetermined threshold value or below.

Thus, by displaying the quadrangular frame 100*b* standardizing the size of the facial image of the time of the registration on the screen of the display section 110, it becomes easy for the human recognition object 100 to adjust a photographing position. Therefore, it becomes possible to restrain deterioration in the recognition rate of a facial image due to a change in the stand position of the human recognition object 100 (a change with year or time or the like). In the case where the quadrangular frame 100*b* standardizing the facial image is displayed on the screen, size information of the facial image of the time of the registration is held in the registration information preservation section 108. The quadrangular frame 110*b* is displayed employing the size information of the facial image held in this registration information preservation section 108. Although the quadrangular frame 110*b* is displayed on the screen to be the standard of a facial image in the above example, the display representing the size of an appropriate facial image may be anything as far as it is represented for the human recognition object 100 so that the size of a facial image becomes appropriate. For example, the display showing the size of an appropriate facial image may be a circle or other polygonal frames, or the size of an appropriate facial image may be shown on a reference line or a reference point.

A speaker may be provided to perform a voice guidance so that the human recognition object 100 comes at an appropriate position. For example, a guidance, "Please move your face a little further away from the camera" is performed when a face is close to the camera, and a guidance, "Please move your face a little closer to the camera" is performed when a face is far from the camera. Thus, a similar advantageous effect is obtained to that of the case where a display showing the size of an appropriate facial image is displayed.

Next, a forth embodiment is explained.

In the forth embodiment, the facial image recognition apparatus explained so far is divided into a registration section and a recognition section, and both sides are connected by a communications line such as the LAN.

Figure 15:
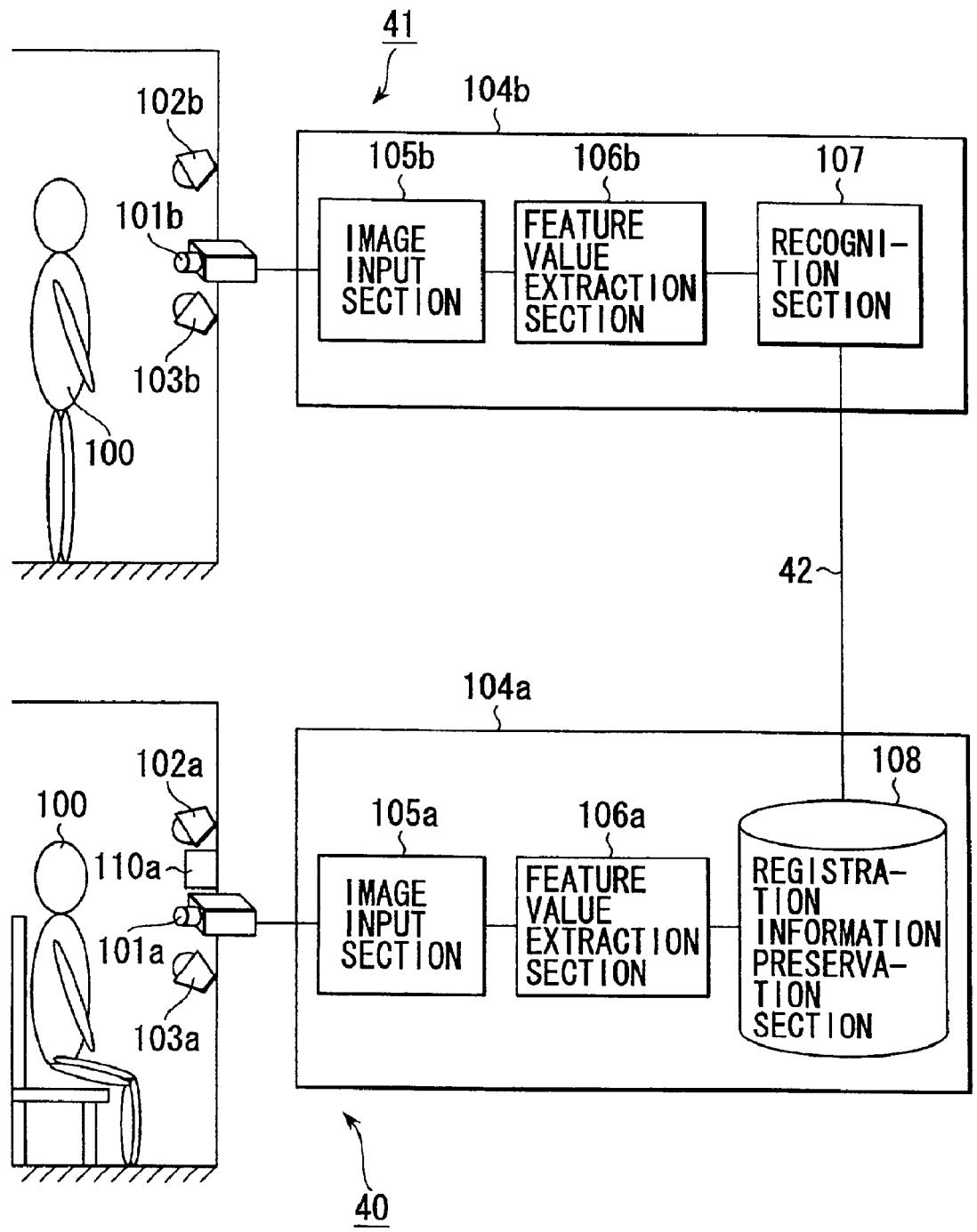
FIG. 15 is a block diagram schematically showing the structure of a facial image recognition apparatus according to a forth embodiment.

FIG. 15 schematically shows the structure of a facial image recognition apparatus according to the fourth embodiment of the present invention. This facial image recognition apparatus is composed of a facial image registration section 40 and a facial image recognition section 41, and both sides are connected by a communications line 42 such as the LAN.

The facial image registration section 40 is a device registering a facial image of the human recognition object 100. The facial image registration section 40 has a camera 101*a*, a first illumination section 102*a*, a second illumination section 103*a*, an image processing section 104*a*, and a display section 110*a*. The display section 110*a* is a display means for displaying a facial image of the human recognition object 100 photographed and for performing registration confirmation of a facial image.

The image processing section 104*a* is composed of an image input section 105*a*, a feature value extraction section 106*a*, and a registration information preservation section 108. The registration information preservation section 108 preserves (stores) a feature value extracted by the feature value extraction section 106*a* as a standard feature value.

The camera 101*a*, the first illumination section 102*a*, the second illumination section 103*a*, the image input section 105*a*, the feature value extraction section 106*a*, and the registration information preservation section 108 have the same structures as those of the camera 101, the first illumination section 102, the second illumination section 103, the image input section 105, the feature value extraction section 106, and the registration information preservation section 108 in the first embodiment described above and have the same operations. Thus, explanation for the same structure parts as those of the first embodiment described above are omitted.

The facial image recognition section 41 is a device recognizing a facial image of the human recognition object 100. The facial image recognition section 41 has a camera 101*b*, a third illumination section (third illumination means) 102*b*, a fourth illumination section (fourth illumination means) 103*b*, and an image processing section 104*b*.

The image processing section 104*b* has an image input section 105*b*, a feature value extraction section 106*b*, and a recognition section 107. The recognition section 107 recognizes who is the human recognition object 100 photographed through the camera 101 or identifies whether or not he is the corresponding person. To perform this type of processing, the recognition section 107 collates (compares) the feature value extracted at the feature value extraction section 106*b* with the feature value preserved in the registration information preservation section 108 of the facial image registration section 40.

The camera 101*b*, the third illumination section 102*b*, the fourth illumination section 103*b*, the image input section 105*b*, the feature value extraction section 106*b*, and the recognition section 107 have the same structures as those of the camera 101, the first illumination section 102, the second illumination section 103, the image input section 105, the feature value extraction section 106, and the recognition section 107 in the first embodiment described above and have the same operations. Thus, explanation for the same structure parts as those of the first embodiment described above are omitted.

Although it is shown that in the facial image registration section 40, the registration is performed in a state wherein the human recognition object 100 sits on a chair or the like, it is possible to register in a state wherein the human recognition object 100 is standing.

Although the facial image registration section 40 does not show a display section for displaying a facial image similarly to the first embodiment, if the registration in the facial image registration section is performed in the state of sitting down, it is possible to provide the display section similarly to the third embodiment and display the size of the facial image of the registration time.

Through the division into the facial image registration section 40 and the facial image recognition section 41, it is possible to install the facial image registration section 40 and the facial image recognition section 41 in mutually different places.

Figure 16:
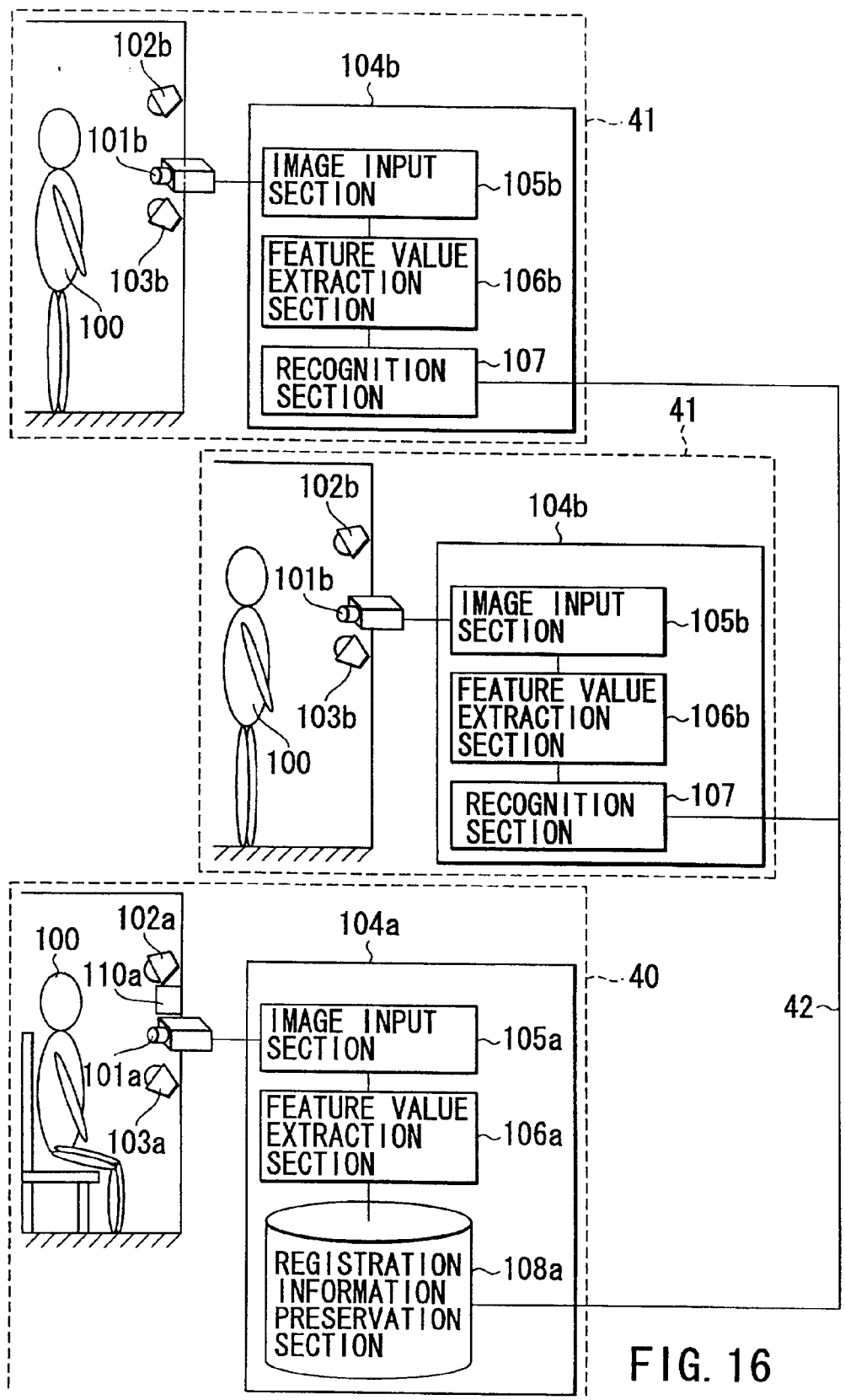
FIG. 16 is a block diagram schematically showing the structure of a facial image recognition apparatus according to another applied example of the forth embodiment.

As another application example of the fourth embodiment, for example as shown in FIG. 16, a structure is deemed wherein a plurality of facial image recognition section 41, . . . are installed for one facial image registration section 40.

In order to employ a facial image recognition apparatus as in the first embodiment, it is necessary to register a facial image to be a standard in each facial image recognition apparatus. According to the application example of FIG. 16, even when the facial image recognition sections 41 are installed in a plurality of places, it is possible to register and utilize the facial image to be the standard only in one facial image registration section 40 and not to resister it in other plural facial image recognition sections 41, . . . . Thus, the number of registrations of facial images of users is reduced to alleviate encumbrance in registration of facial images.

Next, a fifth embodiment is explained.

Figure 17:
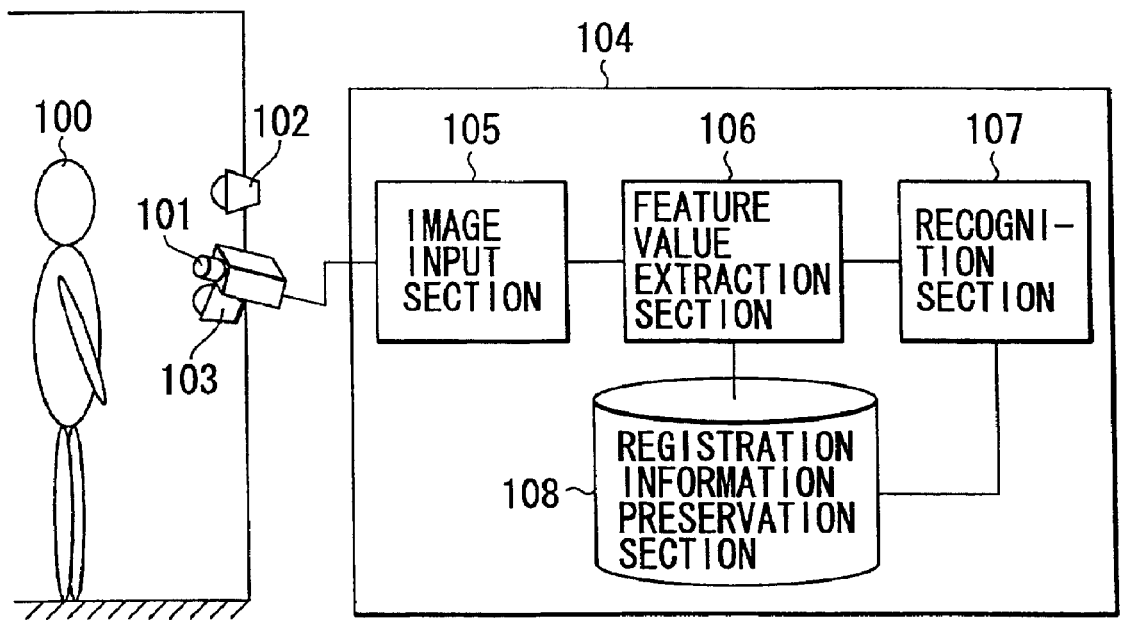
FIG. 17 is a block diagram schematically showing the structure of a facial image recognition apparatus according to a fifth embodiment.

FIG. 17 schematically shows the structure of a facial image recognition apparatus according to the fifth embodiment. The point in which the fifth embodiment is different from the first embodiment is that the camera 101 is installed in a part lower than the face of the human recognition object 100 to photograph a facial image from a lower diagonal direction and that the first illumination section 102 is installed in a right diagonal front or a left diagonal front. In this fifth embodiment, since things other than the different points described above are similar to the first embodiment described above, their explanation is omitted.

The first and second illumination sections 102, 103 may be point light sources, linear light sources, or a combination of a point light source and a linear light source.

With this fifth embodiment, photographing can be performed, giving a shadow reflecting an unevenness feature of an individually specific face shape and excellent contrasts to two nostrils and two pupils that a typical human being has.

Next, a sixth embodiment is explained.

In the sixth embodiment, a plurality of illumination light sources are arranged in a front side of the human recognition object, and these plural illumination light sources are lighted in a predetermined order and time interval. In the sixth embodiment, when the plural illumination light sources are sequentially lighted, facial images are captured one after another. Thus, the registration of a facial image and collation are performed employing the plural facial images captured.

Figure 18:
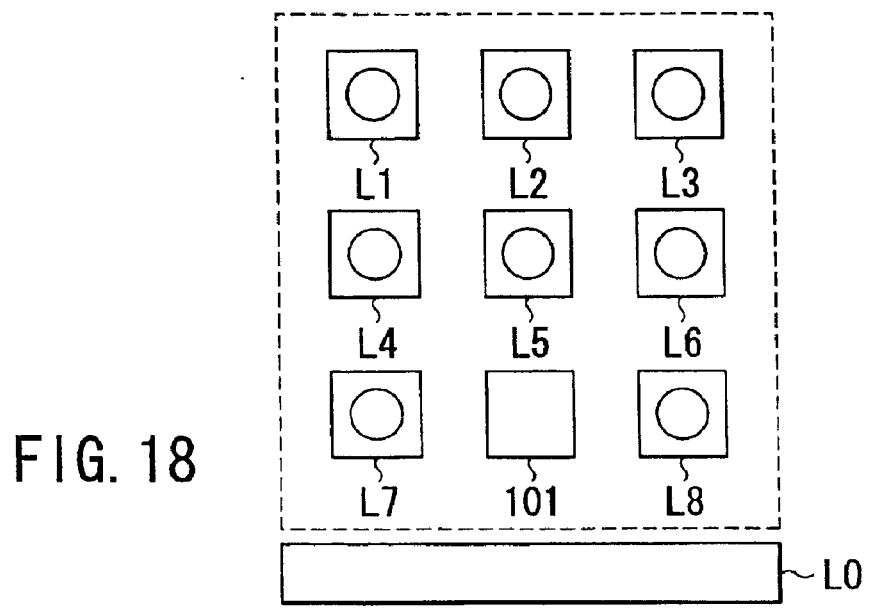
FIG. 18 is a front view schematically showing an arrangement example of an illumination light source according to a sixth embodiment.

FIG. 18 schematically shows an arrangement example of plural illumination light sources L1 to L8 according to the sixth embodiment. In FIG. 18, for example, eight illumination light sources L1 to L8 are point light sources and are arranged at even intervals vertically and horizontally (the so called matrix form) in left and right parts and an upper part of the camera 101 arranged similarly to that of the fifth embodiment. These illumination light sources L1 to L8 are controlled to be sequentially lighted as described later on.

In a lower part of the camera 101, one more illumination light source L0 is arranged. The illumination light source L0 is a linear light source such as, for example, a fluorescent lamp, is to illuminate the face of the human recognition object from a lower diagonal direction, and is constantly lighted.

Figure 19:
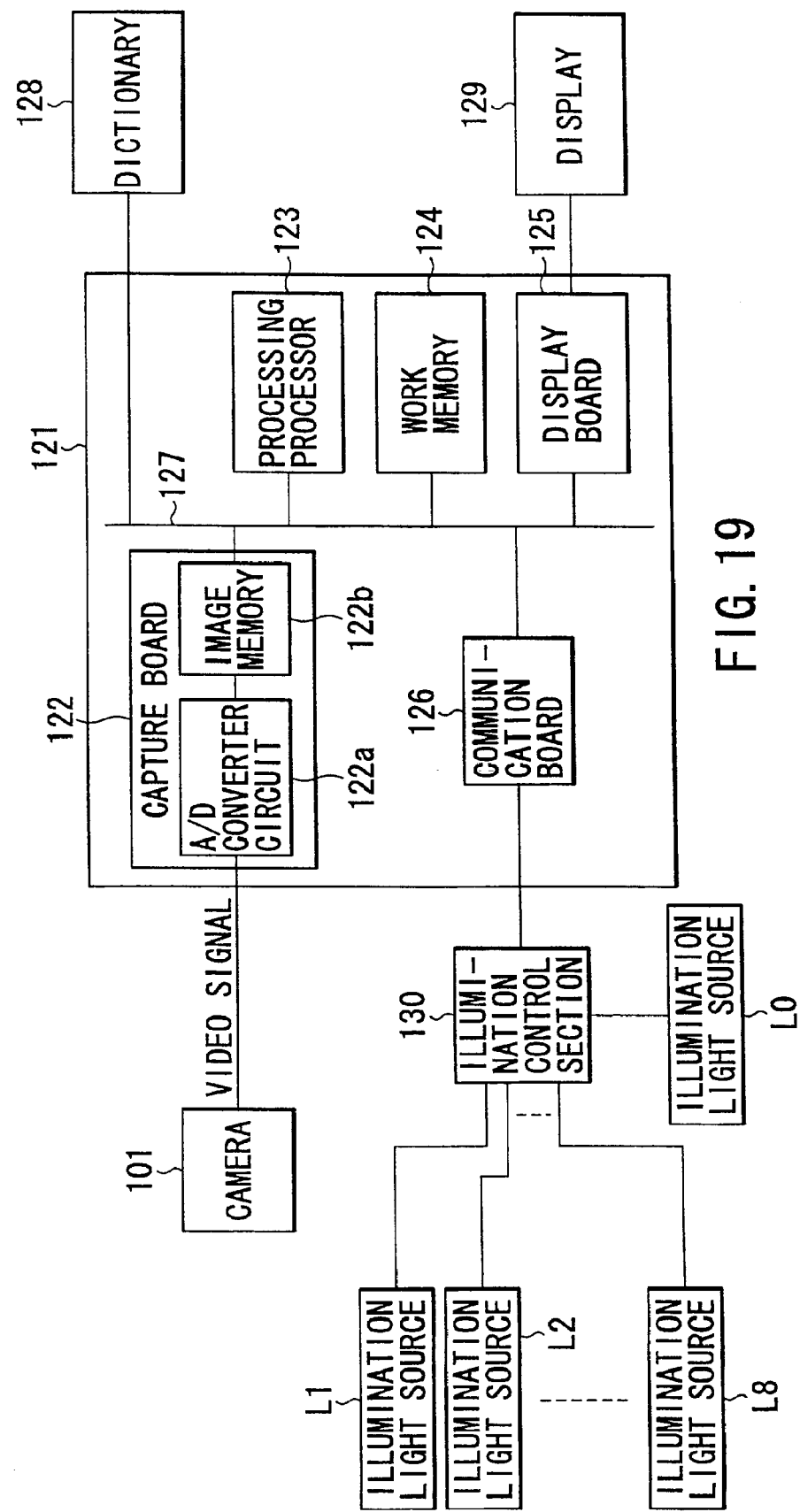
FIG. 19 is a block diagram schematically showing the structure of a facial image recognition apparatus according to the sixth embodiment.

FIG. 19 shows the structure of a facial image recognition apparatus of a case where a plurality of illumination light sources are arranged as shown in FIG. 18. In FIG. 19, the output of the camera 101 (a video signal) is connected to an input of a capture board 122 in an image processing section 121. The capture board 122 is composed of an A/D converter circuit 122a and an image memory 122b. The video signal from the camera 101 (analog data) is converted into digital image data by the A/D converter circuit 122a and is then stored in the image memory 122b for a time.

In the image processing section 121, the capture board 122 is communicatively connected with a processing processor 123, a work memory 124, a display board 125, and a communication board 126 via a system bus 127.

The system bus 127 is connected to a dictionary 128 in which plural sets of dictionary data (standard feature values) are registered (stored). A display 129 is connected to the display board 125. An illumination control section 130 is connected to the communication board 126. The illumination light sources L0, L1 to L8 are connected to the illumination control section 130.

The processing processor 123 captures digital image data according to the facial image photographed in the camera 101 obtained through the capture board 122. With respect to the image data captured like this, the processing processor 123 performs a registration process or a summing process of a facial image, employing the work memory 124 and the dictionary 128. Along with this, the processing processor 123 performs light control of the illumination light sources L0, L1 to L8.

Next, in the structure of the sixth embodiment described above, operations of a main part is explained.

Figure 20:
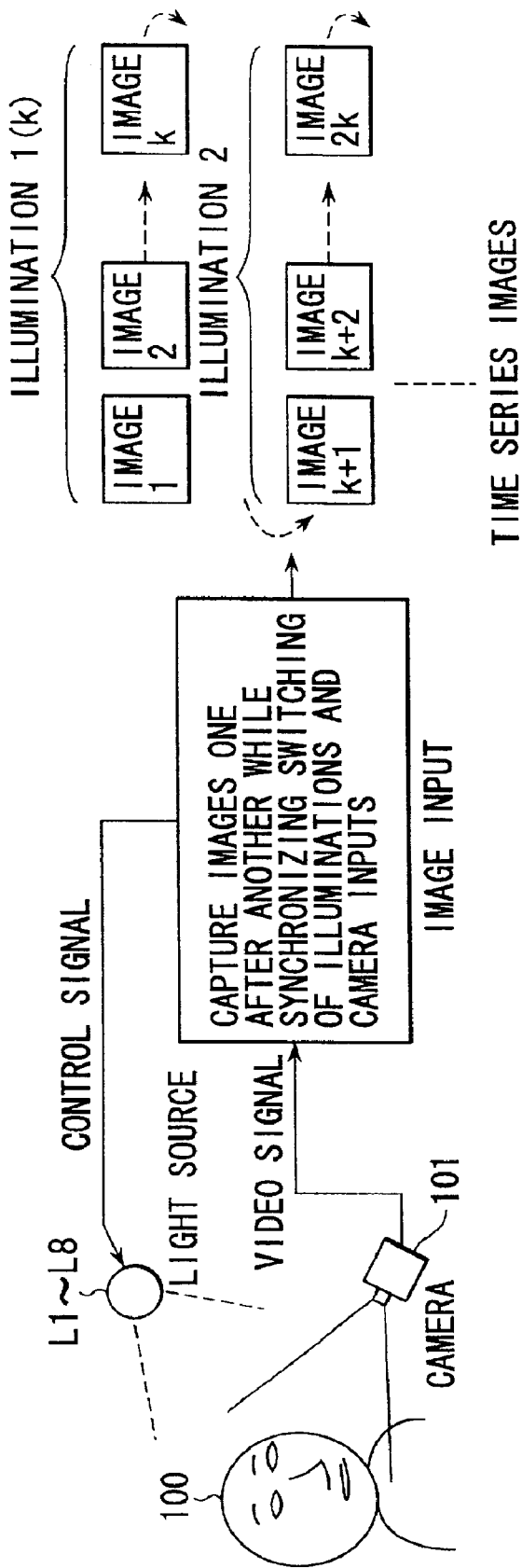
FIG. 20 is a diagram for explaining capture processing of a facial image according to the sixth embodiment.
Figure 21:
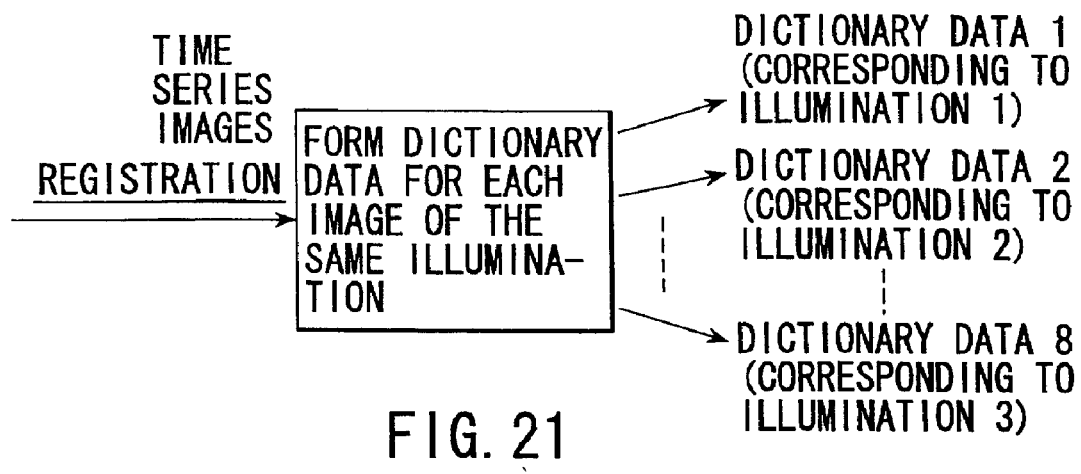
FIG. 21 is a diagram for explaining registration processing according to the sixth embodiment.

First, the registration process is explained referring to FIG. 20 and FIG. 21.

When a facial image is registered, the illumination light source L0 is in a constant lighting state, and the illumination light sources L1 to L8 are lighted one by one in a predetermined order and time interval. The camera 101 sequentially photographs facial images by synchronizing lighting operations of the respective illumination light sources L1 to L8 lighted one by one. These facial images sequentially photographed are captured in the capture board one by one.

As a result, time series images as shown in FIG. 20 are obtained. Here, when it is supposed that the lighting time of the illumination light source L1 is illumination 1, the lighting time of the illumination light source L2 is illumination 2, . . . , the lighting time of the illumination light source L8 is illumination 8, k time series images are obtained for each illumination 1 to 8. The lighting order of the illumination light source L1 to L8 are arbitrary. For example, the lighting order of the illumination light sources L1 to L8 may be from the illumination light source L1 or from the illumination light source L8.

The time series images obtained are stored in the work memory 124. For the time series image data stored in this work memory 124, the processing processor 123 forms dictionary data (standard feature value) for each facial image of the same illumination. That is, the processing processor 123 forms each of dictionary data 1 corresponding to the illumination 1, dictionary data 2 corresponding to the illumination 2, . . . , and dictionary data 8 corresponding to the illumination 8. After forming totally eight, each set of dictionary data 1 to 8, the processing processor 123 registers (stores) each set of the dictionary data 1 to 8 in the dictionary 128.

Figure 22:
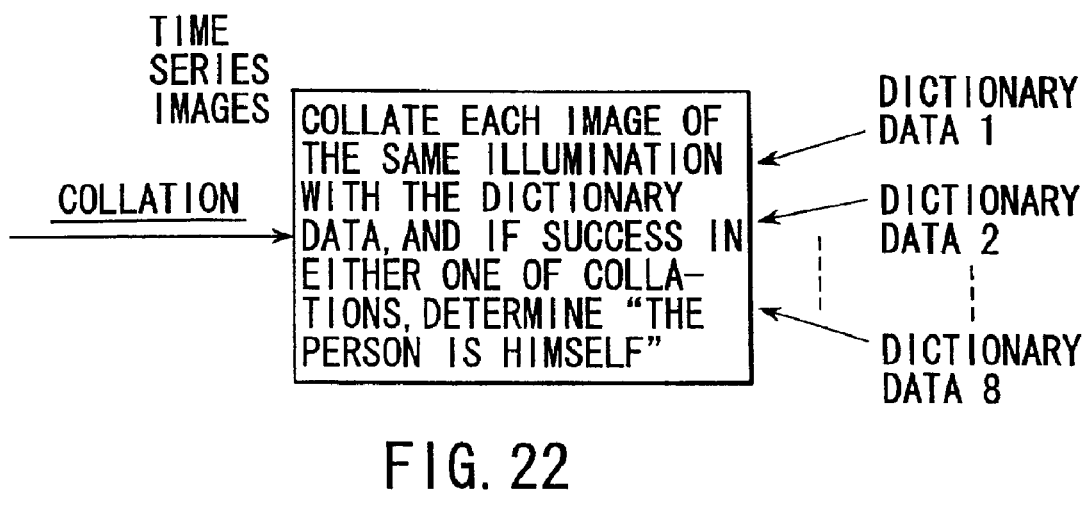
FIG. 22 is a diagram for explaining collation processing according to the sixth embodiment.

Next, the collation process is explained referring to FIG. 20 and FIG. 22.

When facial images are collated, capturing the facial images is performed similarly to that of the registration time as shown in FIG. 20. After the facial images are captured as time series image data, the processing processor 123 sequentially collates the time series images with the dictionary data 1 to 8 in the dictionary 128 for each facial image of the same illumination.

That is, the processing processor 123 collates the input facial image of the time of illumination 1 with the dictionary data 1, the input facial image of the time of illumination 2 with the dictionary data 2, . . . , the input facial image of the time of illumination 8 with the dictionary data 8, respectively. As a result of the collations, for example, when a collation in one of the illumination times succeeds (when correspondence in a collation occurs), the processing processor 123 determines, "It is him."

As a modified example of the collation process, for example, as a result of the collation, if the collations in all illuminations (eight collations) succeed (if all collations correspond), it may be determined that, "it is him." With this collation process, a higher accuracy personal collation becomes possible. By performing such high accuracy personal collation, for example, it is prevented that another person pretends to be the corresponding person, employing the person's picture.

It is possible that the device performing the registration process is composed of a plurality of illumination light sources and the device performing the collation process is composed of a smaller number of illumination light sources than those of the device performing the registration process. When such structural devices are employed, the registration process is performed employing a plurality of illuminations at the time of the registration, and the collation process is performed employing a smaller number of illuminations than those of the registration time at the time of the collation. By constructing such apparatus, the structure of the device performing the collation process can be simplified. Therefore, this becomes effective in an environment in which the devices for the collation has to be installed in a plurality of doorways in which illumination environments are different. That is, the structure as described above is effective as an application example of a case where the registration process is performed in a specified place in which its illumination environment can be controlled and where the collation process is performed in plural doorways in a wide area.

Next, a seventh embodiment is explained.

The seventh embodiment is an example of a case where, for example, the facial image recognition apparatus explained in the first embodiment is applied to a pass control apparatus controlling the pass of a passenger, recognizing the facial image of the passenger. Here, although a case where the facial image recognition apparatus explained in the first embodiment is applied is explained as a representation, the facial image recognition apparatus explained in the second embodiment or the sixth embodiment can be similarly applied.

Figure 23:
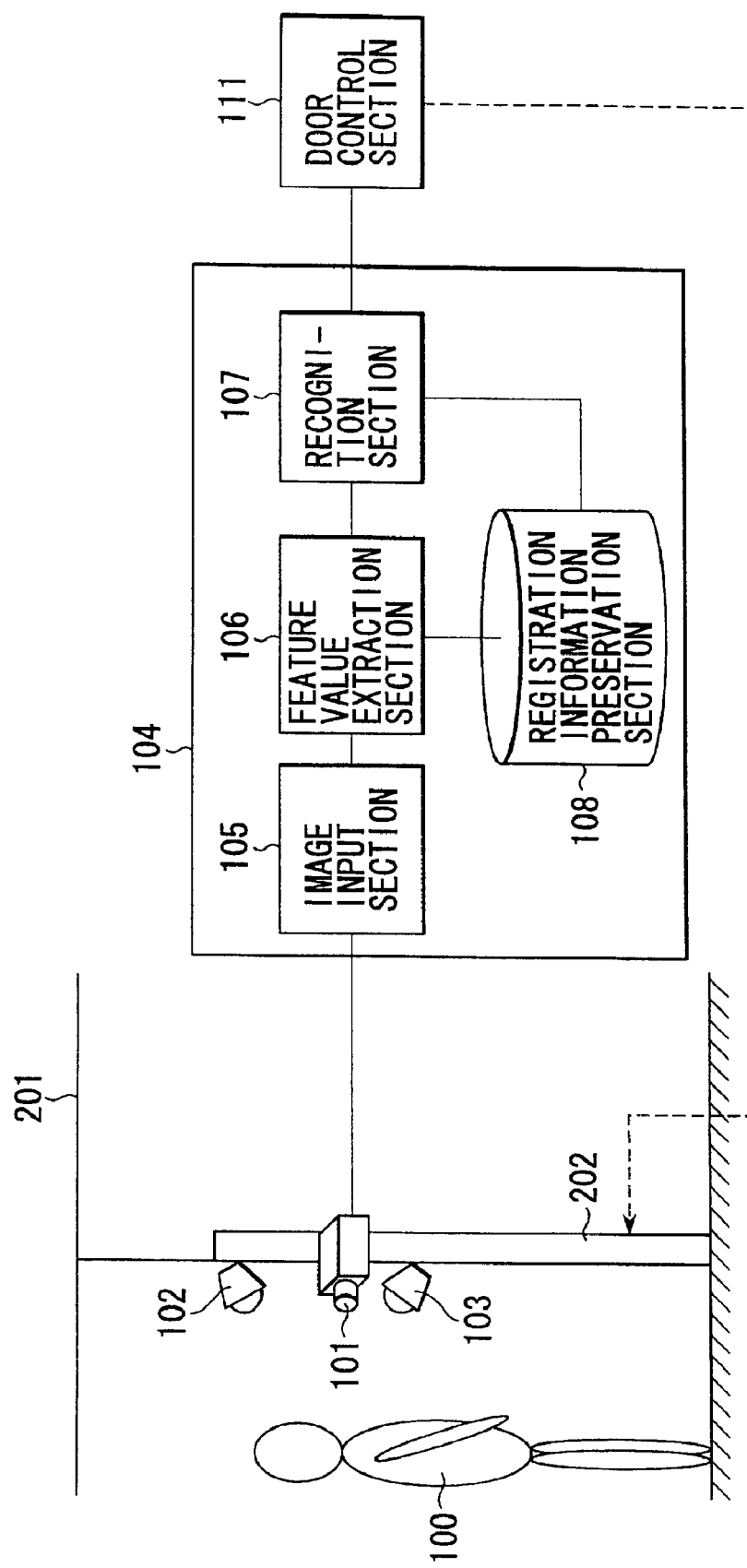
FIG. 23 is a block diagram schematically showing the structure of a pass control apparatus according to a seventh embodiment.

FIG. 23 schematically shows the structure of a pass control apparatus according to the seventh embodiment. This pass control apparatus performs, for example, entering/leaving room management for an important facility. That is, in the entering/leaving room management that the pass control apparatus according to the seventh embodiment performs, the facial image of a user (passenger) is recognized, and based on its recognition result, opening/closing of an entering/leaving room door of an important facility is performed. This pass control apparatus has a camera 101, a first illumination section 102, a second illumination section 103, an image processing section 104, a recognition section 107, a door control section 111, and the like as shown in FIG. 23.

Explanation for the structures of those other than the door control section 111 shown in FIG. 23 is omitted since such structures are similar to those of the facial image recognition apparatus of FIG. 1.

The door control section 111 performs opening/closing control of an entering/leaving room door 202 of an important facility (a security significant room or the like) 201 responding to a recognition result of the recognition section 107. That is, the door control section 111 controls opening and closing of the entering/leaving room door 202 or locking and unlocking of the entering/leaving room door 202 in accordance with a recognition result of a facial image.

The recognition section 107, for example, outputs a "door open" signal to the door control section 111 when the degree of similarity sought is greater than the threshold value in step ST6, or step ST 11 of FIG. 6. The recognition section 107 outputs a "door close" signal to the door control section 111 when the degree of similarity sought is smaller than the threshold value in step ST6 or step ST11 of FIG. 6.

When receiving the "door open" signal from the recognition section 107, the door control section 111 performs control so that the entering/leaving room door 202 is in an open state. Thus, the human recognition object (in this case, passenger) 100 is allowed to enter the room. The door control section 111, when receiving the "door close" signal from the recognition section 107, holds the entering/leaving room door 202 in a close state. Thus, the passenger 100 is denied entering room.

Thus, with the seventh embodiment, the pass of a passenger can be controlled employing the facial image recognition apparatus explained in the first embodiment. Of course, as described above, employing the facial image recognition apparatus explained in the second or sixth embodiment allows the pass of a passenger to be controlled similarly.

Next, an eighth embodiment is explained.

The eighth embodiment, similarly to the seventh embodiment, is an example of a case that is appropriate to a pass control apparatus controlling the pass of a passenger while recognizing the facial image of the passenger. In the present example, explained is a case where, for example, a wireless card reader is employed as a means inputting specific information identifying a passenger.

Figures 24, 25:
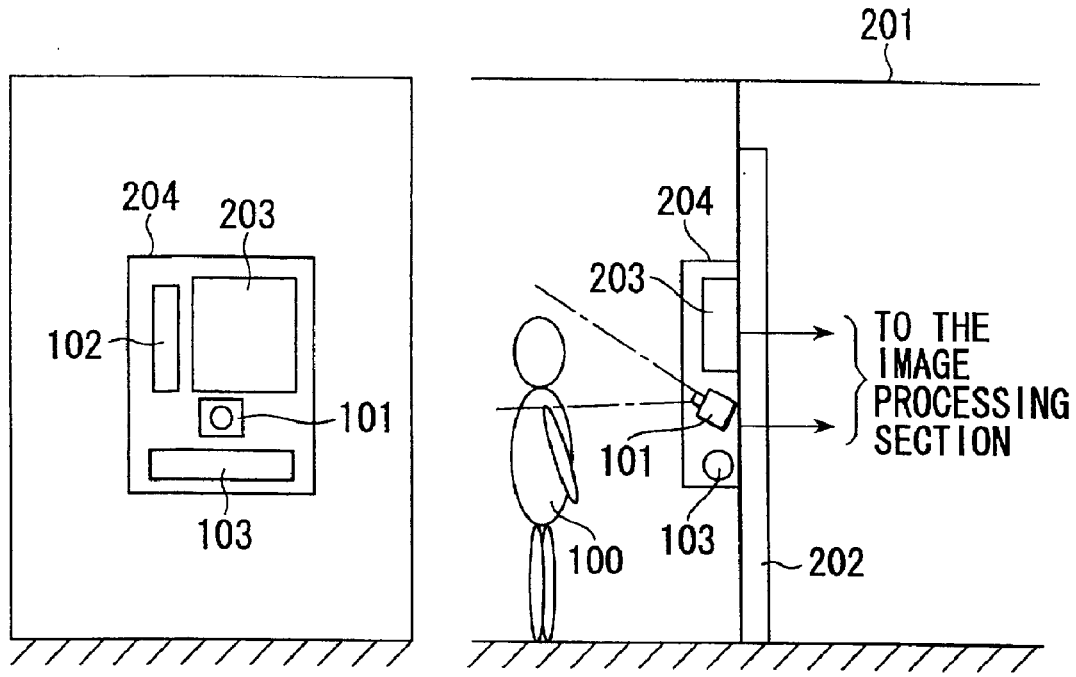
FIG. 24 is a side view schematically showing the structure of a facial image capture section of a pass control apparatus according to an eighth embodiment.
FIG. 25 is a front view schematically showing the structure of the facial image capture section of the pass control apparatus according to the eighth embodiment.

FIG. 24 is a side view schematically showing the structure of a facial image capture section of a pass control apparatus according to the eighth embodiment. FIG. 25 is a front view schematically showing the structure of a facial image capture section of the pass control apparatus shown in FIG. 24. In FIG. 24 and FIG. 25, for example, in a left diagonal upper part of the camera 101 arranged similarly to that of the fifth embodiment, a linear first illumination section 102 is provided vertically. The liner second illumination section 103 is provided horizontally in a lower part of the camera 101.

Although the first illumination section 102 and the second illumination section 103 may be point light sources, linear light sources, or a combination of a point light source and a linear light source, linear light sources such as fluorescent lamps are employed in any way in this eighth embodiment. In this eighth embodiment, it is supposed that the human recognition object (in this case a passenger) 100 carries with him a wireless card in which an ID code as specific information specifying the passenger is stored.

As shown in FIG. 24 and FIG. 25, a wireless card reader 203 is provided in an upper part of the camera 101. This wireless card reader 203 wirelessly communicates with the wireless card (not shown) that the human recognition object (in this case a passenger) 100 carries with him. Thus, the wireless card reader 203 reads the ID code as specific information specifying a passenger stored in the wireless card in a non-contact manner.

The camera 101, the first illumination section 102, the second illumination section 103, and the wireless card reader 203 are installed adjacent to the entering/leaving room door 202 of the important facility (a security significant room or the like) 201 as a facial image capture unit 204.

Figure 26:
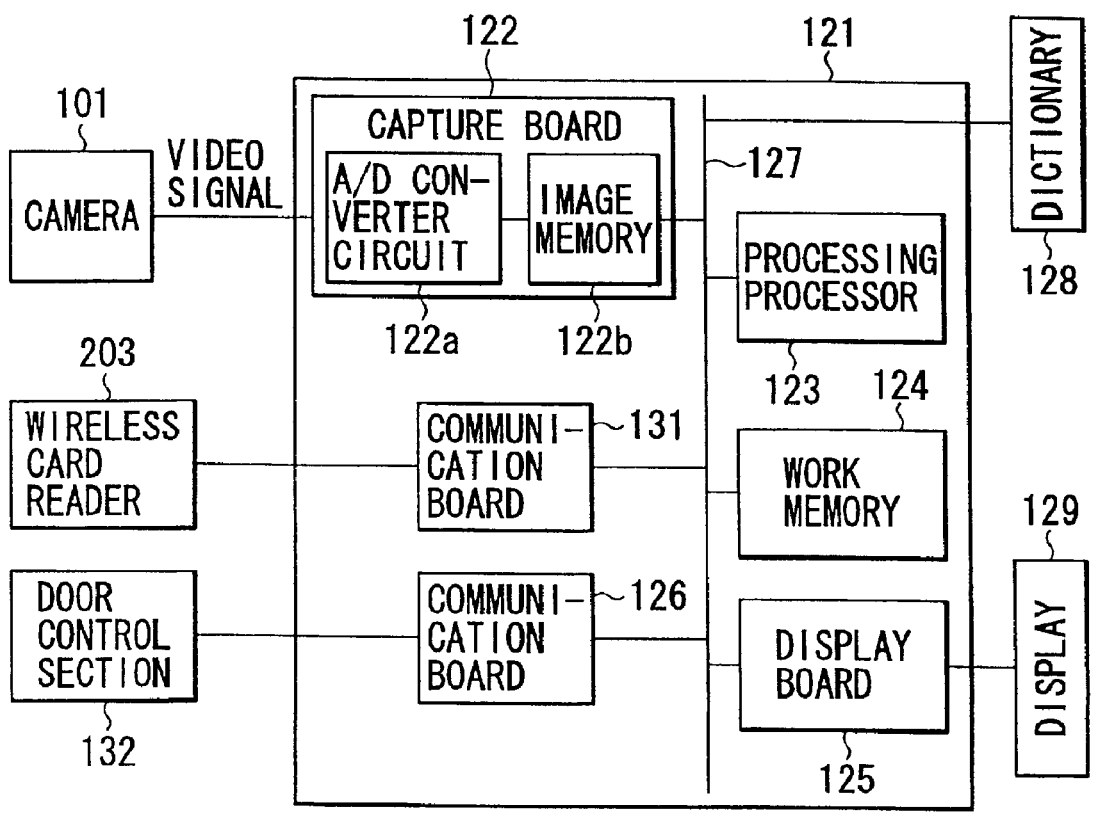
FIG. 26 is a block diagram schematically showing the structure of a pass control apparatus according to the eighth embodiment.

FIG. 26 shows the structure of a pass control apparatus of a case where the facial image capture section shown in FIG. 24 and FIG. 15 is employed. This pass control apparatus shown in FIG. 26 is the one in which the pass control apparatus explained in the seventh embodiment is applied to the face recognition apparatus shown in FIG. 19. The pass control apparatus shown in FIG. 26 is roughly similar to the structure shown in FIG. 19 basically, but it differs in a point that a communication board 131 connecting the wireless card reader 203 is provided and a door control section 132 performing opening/closing control of the entering/leaving room door 202 is connected to the communication board 126. In the dictionary 128 of FIG. 26, dictionary data (standard feature values) corresponding to each of the ID codes specifying passengers are registered (stored).

Since the structures of the camera 101, the capture board 122, the A/D converter circuit 122a, the image memory 122b, the processing processor 123, the work memory 124, the display board 125, the display 129, and the system bus 127 are the same as those shown in FIG. 19, explanation thereof is omitted.

Next, operations of a main part of the eighth embodiment structured described above are explained.

When a passenger 100 carrying the wireless card with him positions himself in front of the facial image capture unit 204, the processing processor 123 communicates with the wireless card that the passenger 100 carries with him via the wireless card reader 203. Thus, the processing processor 123 reads the ID code of the passenger 100 by the wireless card reader 203 and photographs the facial image of the passenger 100 by the camera 101. This photographed facial image is captured in the image processing section 121 by the capture board 122.

The processing processor 123 then searches the dictionary data managed by the corresponding ID code by referring to the dictionary 128 based on the ID code read from the wireless card. The processing processor 123 performs the collation process of the captured facial image of the passenger 100 in connection with the dictionary data searched. Based on a result of this collation process, the processing processor 123 finally determines whether or not the person is himself. As a result of the determination, if it is him, the processing processor 123 outputs the "door open" signal to the door control section 132. If it is not him, the processing processor 123 outputs the "door close" signal to the door control section 132.

The door control section 132, when receiving the "door open" signal, performs control so that the entering/leaving room door 202 is in an open state. Thus, the passenger 100 is allowed to enter the room. The door control section 132, when receiving the "door close" signal, holds the entering/leaving room door 202 in a close state. Thus, the passenger 100 is denied entering room.

The wireless card may be communicated in a state wherein the wireless card is kept in a pocket or the like of the passenger 100 or is held up by the hand to the wireless card reader 203. In the case where it is held up by the hand to the wireless card reader 203, since it is a natural movement that the passenger 100 looks at the direction of the wireless card reader 203, there is an advantage that the camera 101 can be arranged so that the front facial image of the passenger 100 is photographed in such opportunity.

It is not always necessary to employ a card like object as a wireless medium, and it is possible to transform the wireless medium into various objects such as a wireless tag in modes of a business card, a lapel pin, a pendant, and the like and implement them.

The method acquiring the ID code of the passenger 100 is not limited to a method employing the wireless card reader. The essential theme is characterized in that a means operating in a remote and non-contact manner is employed combinationally while making use of the advantage in capturing a facial image in the remote (non-contact) manner. Thus, for example, the wireless medium may be a portable telephone, a portable remote terminal with a wireless function or the like.

Next, a ninth embodiment is explained.

The ninth embodiment records a facial image photographed by a camera along with additive information. For example, the ninth embodiment, in the pass control apparatus such as of the eighth embodiment, employs a camera for photographing a facial image for the collation as a camera for photographing an image (video) for recording. The image for recording is added additive information showing that the camera has detected the facial image of a passenger or that the collation is succeeded/failed and is recorded.

Figure 27:
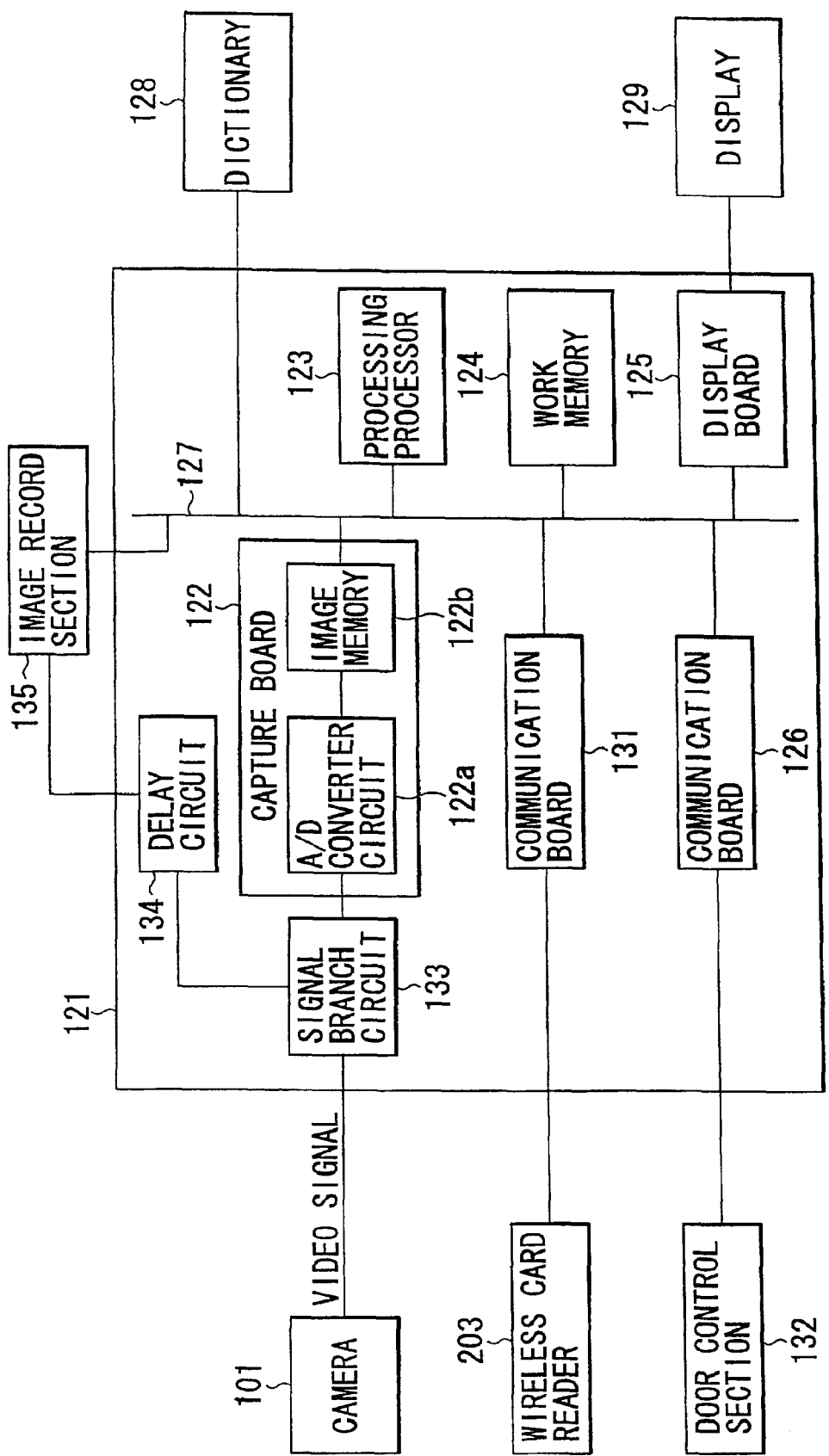
FIG. 27 is a block diagram schematically showing the structure of a pass control apparatus according to a ninth embodiment.

FIG. 27 schematically shows the structure of a pass control apparatus according to the ninth embodiment. The pass control apparatus shown in FIG. 27 basically has a roughly similar structure to the pass control apparatus shown in FIG. 26. The pass control apparatus shown in FIG. 27 is different from the pass control apparatus shown in FIG. 26 in a point that a signal branch circuit 133, a delay circuit 134, and an image record section 135 are added. The signal branch circuit 133 branches a video signal from the camera 101. The delay circuit 134 delays the video signal branched in the signal branch circuit 133 over a period of time. The image record section 135 records the video signal delayed in the delay circuit 134 over a period of time.

Since the respective structures other than the signal branch circuit 133, the delay circuit 134, and the image record section 135 of the pass control apparatus shown in FIG. 27 are the same as those shown in FIG. 26, their explanation is omitted.

In the image record section 135, on/off of a record operation is controlled by the processing processor 123. That is, the processing processor 123, when detecting the facial image of the passenger 100 through the image from the camera 101, sends a record start signal to the image record section 135. The image record section 135, when receiving the record start signal from the processing processor 123, starts recording from an image (video) before a period of time (delay time of the delay circuit 134) from that time point.

When the collation of the facial image is finished (collation is succeeded or failed), the processing processor 123 sends a record stop signal along with additive information showing success or failure of the collation to the image record section 135. The image record section 135, when receiving the record stop signal from the processing processor 123, records the additive information showing collation success or failure corresponding to the recorded image to stop the record operation of the image.

With this type of operation, facial images from the time when a facial image of a passenger is detected until collation finish time are recorded as continuous images in the image record section 135. The image record section 135 records the collation result (success/failure) corresponding to the recorded image as the additive information.

The image record section 135 may employ any type of image record means such as, for example, a magnetic tape record device, a magnetic disk record device, an optical disk record device, or the like.

With this ninth embodiment, a person's image detected by the camera can be recorded along with the additive information. Thus, security can be improved, and dealing with a trouble when the trouble happens becomes easy.

Next, a tenth embodiment is explained.

In the tenth embodiment, an image photographed by a camera is transmitted to a remote supervisory monitor. For example, the tenth embodiment, in the pass control apparatus such as of the eighth embodiment, employs a camera for photographing a facial image for collation as a camera for photographing an image (video) for the remote supervisory.

The image for the remote supervisory is added additive information showing that the camera has detected the facial image of a passenger or that the collation is succeeded/failed and is transmitted to the remote supervisory monitor.

Figure 28:
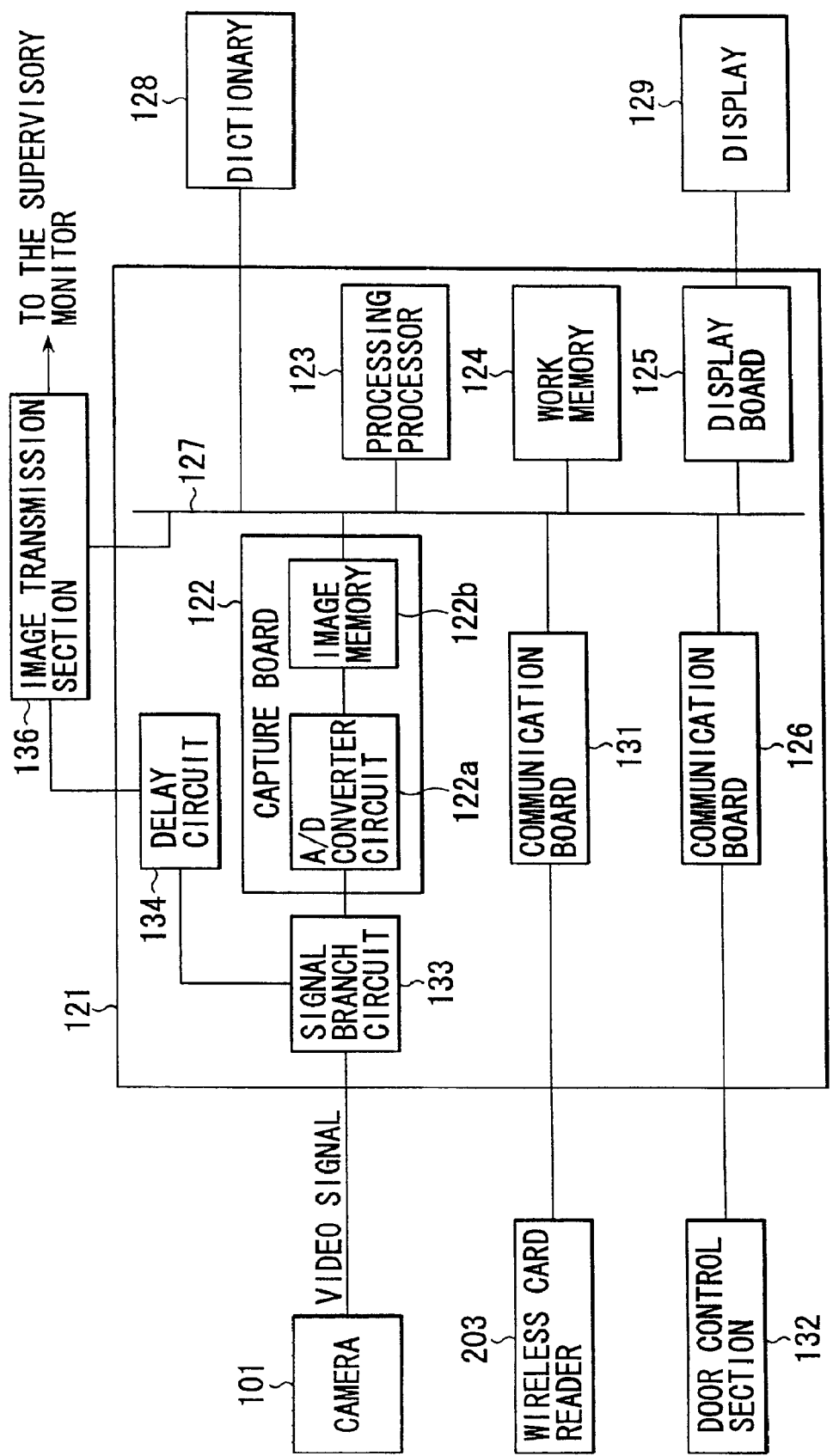
FIG. 28 is a block diagram schematically showing the structure of a pass control apparatus according to a tenth embodiment.

FIG. 28 schematically shows the structure of a pass control apparatus according to the tenth embodiment. The pass control apparatus shown in FIG. 28 is basically similar to the pass control apparatus shown in FIG. 27 but is different from it in the point that an image transmission section 136 is in the place of the image record section 135.

Since the respective structures other than the image transmission section 136 of the pass control apparatus shown in FIG. 28 are the same as those shown in FIG. 27, their explanation is omitted.

In the image transmission section 136, on/off of a transmission operation is controlled by the processing processor 123. That is, the processing processor 123, when detecting the facial image of the passenger 100 through the image from the camera 101, sends a transmission start signal to the image transmission section 135. The image record section 135, when receiving the transmission start signal from the processing processor 123, starts transmitting the image from the image (video) prior to a period of time (delay time of the delay circuit) from the time point when receiving the transmission start signal to a remote supervisory monitor (not shown).

When the collation of the facial image is finished (collation is succeeded or failed), the processing processor 123 sends a transmission stop signal along with additive information showing success or failure of the collation to the image transmission section 135. The image transmission section 135, when receiving the transmission stop signal from the processing processor 123, transmits the additive information showing collation success or failure and stops the transmission of an image.

With this type of operation, the image transmission section 135, after detecting the facial image of the passenger, transmits the facial images of collation completion as continuous images to the remote supervisory monitor. The image transmission section 135 transmits the collation result (success/failure) corresponding to the transmitted images as the additive information to the remote supervisory monitor.

With this tenth embodiment, a person's image detected by the camera can be transmitted along with the additive information to the remote supervisory monitor. Thus, monitoring through a remote monitor can be performed, and security can be improved.

Next, an eleventh embodiment is explained.

The eleventh embodiment is the one in which the ninth embodiment and the tenth embodiment described above are combined and digital transmission is employed for the transmission of images.

Figure 29:
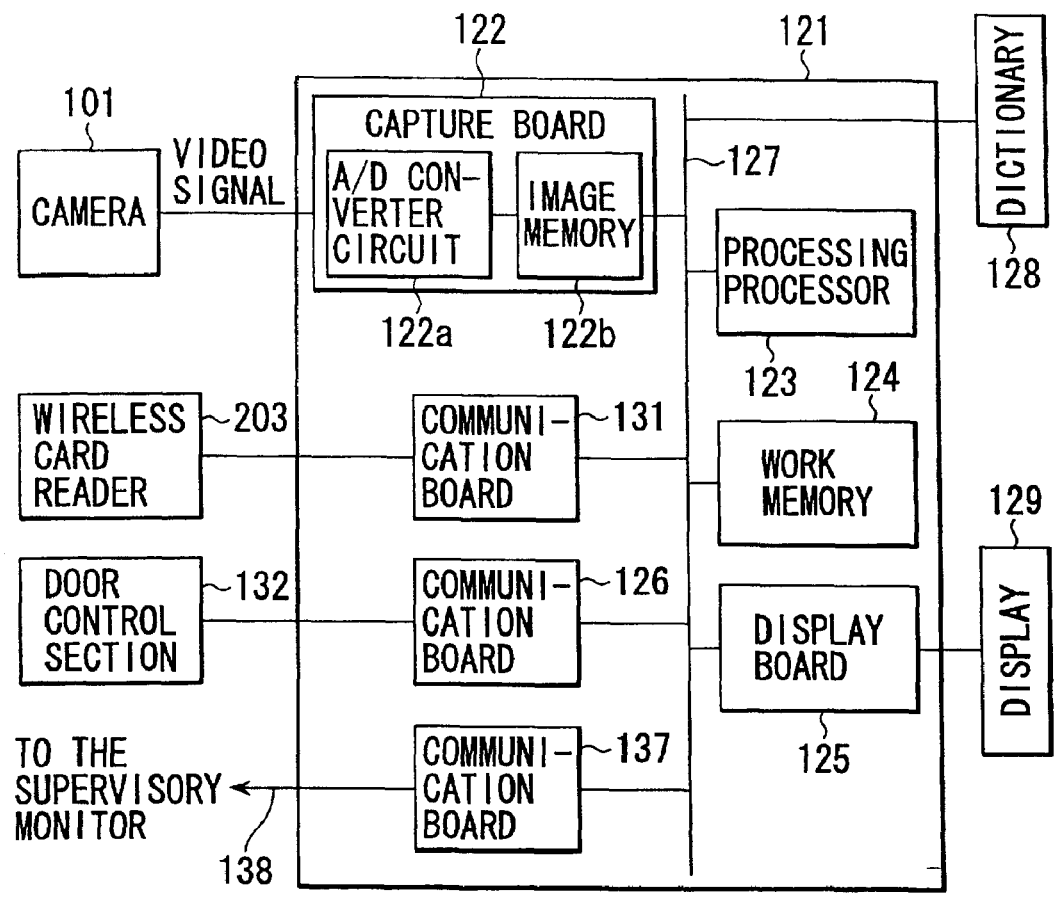
FIG. 29 is a block diagram schematically showing the structure of a pass control apparatus according to an eleventh embodiment.

FIG. 29 schematically shows the structure of a pass control apparatus according to the eleventh embodiment. Although being similar to the pass control apparatus shown in FIG. 26, the pass control apparatus shown in FIG. 29 differs in the point that a communication board 137 is added. This communication board 137 is connected to a digital line 138 such as the LAN or the Internet. This communication board 137 transmits an image to a monitoring center via the digital line 138. In the pass control apparatus shown in FIG. 29, the processing processor 123 has a transmission function that an image digitized via the digital line by the communication board 137 is transmitted to the monitoring center. The monitoring center has a supervisory monitor (not shown) displaying an image transmitted from the pass control apparatus or an image record device (not shown) recording an image transmitted from the pass control apparatus.

The pass control apparatus shown in FIG. 29 is similar to the pass control apparatus shown in FIG. 26 except for a function transmitting a digitized image to the monitoring center via the digital line 128 by the communication board 137. Thus, in the following explanation, explanation for similar parts to those of the pass control apparatus shown in FIG. 26 is omitted. The pass control apparatus shown in FIG. 29 is explained below.

The processing processor 123, when detecting a facial image of the passenger 100 through an image from the camera 101, starts transmitting the facial image to the monitoring center from the facial image prior to a period of time from the time when the facial image of the passenger 100 is detected. When the facial image is transmitted, the processing processor 123 performs digital transmission to the monitoring center connected via the digital line 138 such as the LAN or the Internet by the communication board 137.

When collation of the facial image is finished (collation success or failure), the processing processor 123 transmits additive information showing collation success or failure and stops transmitting the facial image to the monitoring center. Thus, images from the time when the facial image of the passenger is detected until collation completion are transmitted as continuous images.

When a digital image is transferred to the monitoring center via the digital line, compression of the image may be performed. As a format of image compression, for example, motion JPEG or MPEG4 or the like that are world standard dynamic image formats can be employed.

In the respective embodiments described above, although a case where a camera having a sensitivity in a conventional visible wavelength region is employed is explained, an infrared camera having a sensitivity in an infrared wavelength region may be employed, a range finder by which distance information (depth information) is obtained may be employed, and different types of cameras may be employed together.

Next, a twelfth embodiment is explained.

Figure 30:
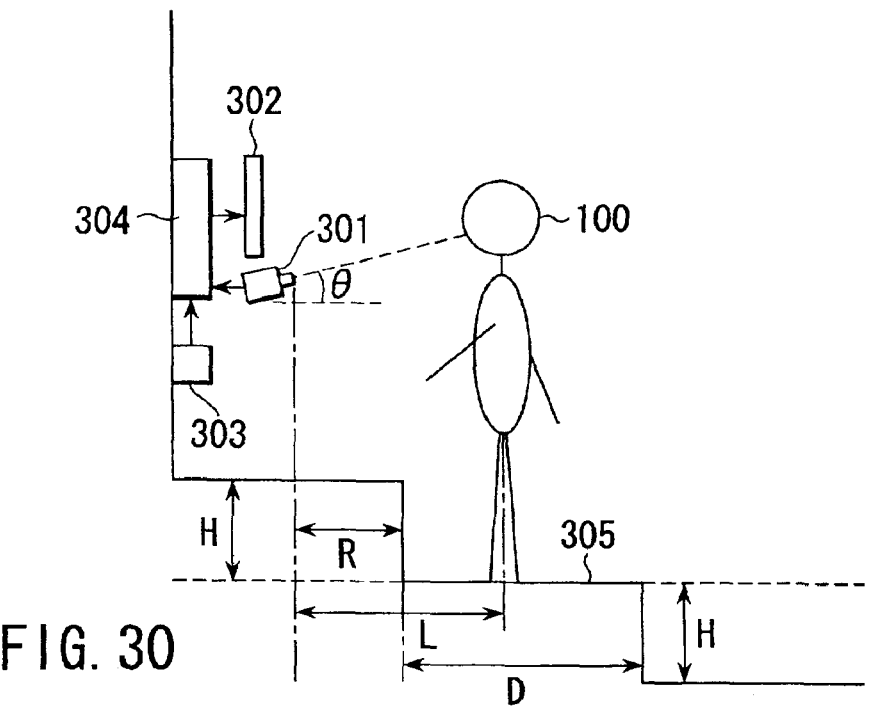
FIG. 30 is a block diagram schematically showing the structure of a facial image recognition apparatus according to a twelfth embodiment.

FIG. 30 schematically shows the structure of a facial image recognition apparatus according to the twelfth embodiment of the present invention. This facial image recognition apparatus is composed of a camera 301, a monitor 302, an information input device 303, and an image processing section 304. In this facial image recognition device, the camera 301 is installed so as to photograph a facial image of the human recognition object 100 positioning himself on a floor face 305 having differences in elevation. The camera 301 and the image processing section 304 have similar structures to, for example, the camera 101 and the image processing section 104 of the facial image recognition apparatus shown in FIG. 1.

The monitor 302 displays images or the like photographed by the camera 301. The monitor 302 is installed at a position corresponding to the face when the human recognition object 100 positions himself on the floor face 305. The camera 301 is an image input device capable of inputting a dynamic image such as, for example, a television camera employing an image pickup element such as a CCD sensor. Only one camera 301 is installed in a lower side of the monitor 302.

The information input device 303 is composed of an infrared sensor sensing that the human recognition object 100 comes to the inside of a photographing vision field of the camera 301. The information input device 303 is composed of a wireless card reader reading ID code information from a wireless card when the human recognition object 100 carries on the wireless card for inputting the ID code information.

In FIG. 30, when the human recognition object 100 stands on a predetermined position supported by a stop position mark or the like which is not shown according to each person's height, the information input device 303 senses the human recognition object 100. The information input device 303, when sensing the human recognition object 100, informs the image processing section 304 of sense information or the ID code information of the human recognition object 100. The image processing section 304 informed of the sense information or the ID code information performs the recognition process, employing a facial image inputted from the camera 301.

The camera 301 is installed at an immediately lower side position with respect to the monitor 302 in such a manner that the camera 301 faces in an upper diagonal direction at a predetermined angle θ with respect to the floor face 305. With this installation, the camera 301 photographs a facial image of the human recognition object 100 from a lower direction. This is because the camera 301 is easy to capture nostrils of the human recognition object 100.

With such arrangement, it becomes easy for the human recognition object 100 to bring his face position within a photographing visual field range of the camera 301 in a simple structure. Further, since the human recognition object 100 tunes his facial position in exactly so that his facial image is shown on the monitor 302 while confirming his own facial image on the monitor 302, encumbering the human recognition object 100 is reduced. Moreover, since it is made easy to capture nostrils, the accuracy at the time when a nasal position is detected from a facial image can be improved, and recognition performance can be improved.

Inputting facial images of both of a high height person and a low height person only by a single camera 301 causes encumbrance on the human recognition object 100 in terms of his posture of the like. Therefore, in the present twelfth embodiment, as shown in FIG. 30, by changing a predetermined position due to a stop position mark or the like which is not shown and a height of the floor face 305 at the predetermined position according to differences in height of human recognition objects 100, it is realized to input a facial image in a state wherein the human recognition object 100 postures in a naturally standing manner without causing encumbrance on him.

Figure 31:
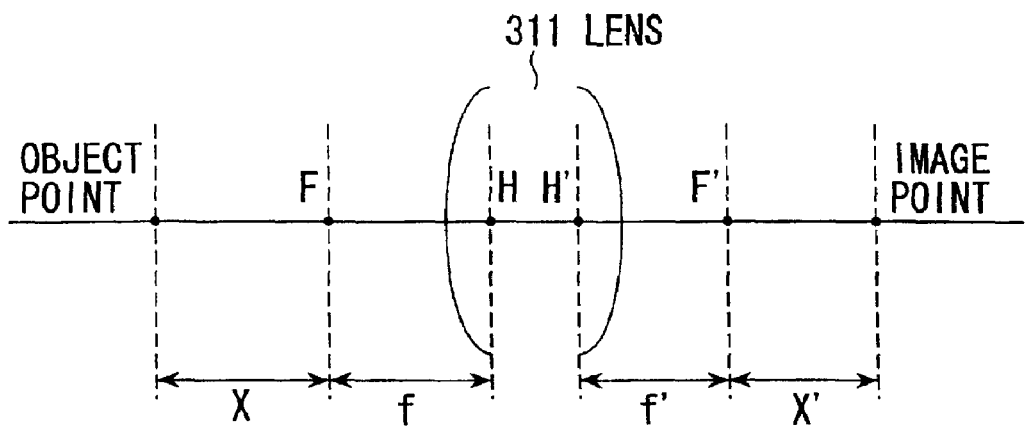
FIG. 31 is an explanatory view for explaining an image formation relationship of a lens of a camera.

A vertical direction visual field region of the camera 301 is explained. In general, at a time when there is a positional relationship as shown in FIG. 31, a longitudinal magnification β is obtained by the following equation (1), $$\beta = Y'/Y = f/X = X'/f' \quad (1)$$

wherein f is called a focal length of the object-space, and f' is called a focal length of the image-space. Y is a image pickup region in a vertical direction, and Y' is an image-formation region in a vertical direction.

Figure 32:
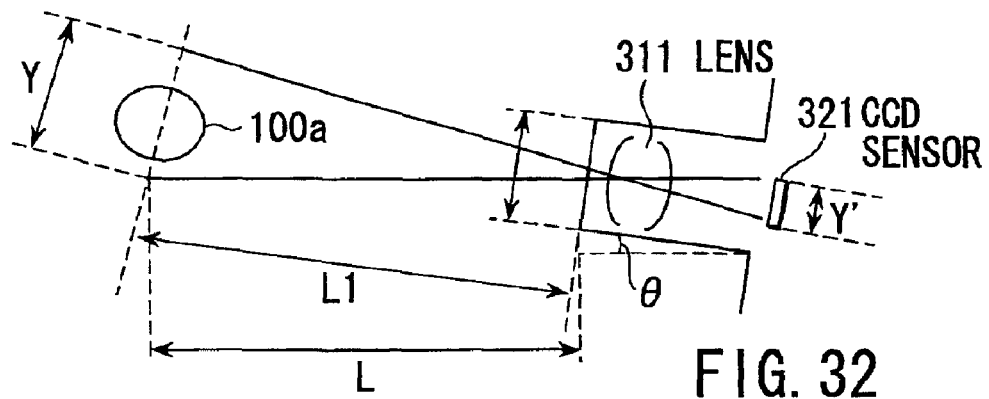
FIG. 32 is a drawing showing a relationship between the a photographing area and a distance of a camera.

It is supposed that a single lens 311 is employed in the camera 301 in order to simplify explanation below. Here, f becomes equal to f'. FIG. 32 shows a positional relationship between the camera 301 and a face 100a of the human recognition object 100, and when the face 100a of the human recognition object 100 is within the photographing region Y in the vertical direction, face recognition can be performed. When it is supposed that the vertical size of a CCD sensor 321 of the camera 301 is Y' and the distance between the distal end of the camera 301 and the face 100a is L1, the distance L1 can be roughly approximated at X in the equation (1). Accordingly, as the following equation (2), Y can be sought.

$$Y = (Y'/f) * (L/\cos \theta) \quad (2)$$

L is the distance between the camera 301 and the human recognition object 100 in a direction parallel to the floor face 305.

When it is assumed that the camera 301 composed of the lens 311 having a focal length=4 mm and the CCD sensor 321 having a longitudinal length=2.74 mm is employed, if θ=30.degree. and L=70 cm, through the equation (2), Y=about 55 cm of visual field region.

When it is supposed that the longitudinal facial length of a general grown-up is 25 cm, in such condition, theoretically, the entire face can be inputted corresponding to a height change up to 30 cm. When 140 to 200 cm of the height of human recognition objects 100 are made objects, in order to straightly look at the monitor 302 while a human recognition object 100 naturally stands still at a position, it is necessary to make a height division of two steps of (a) 140 to 170 cm and (b) 170 to 200 cm.

In this twelfth embodiment, in FIG. 30, for example, when the floor face 305 is stepped as R=50 cm, L=70 cm, D=40 cm, H=30 cm, persons of (a) are photographed at a step of the position of distance L=70 cm from the camera 301, and persons of (b) are photographed at a step position of L=110 cm, photographing facial images of human recognition objects 100 of said height regions can be realized. At the step position of L=110 cm, a longitudinal height tolerance becomes greater than 30 cm.

Thus, through the lens 311 of the camera 301, the size of the CCD sensor 321, the angle of the camera 301, the photographing distance from the camera 301, and the like, by providing more than one step in the floor face 305, facial images of human recognition objects 100 with various heights can be obtained through a simple structure while the human recognition objects 100 posture in a naturally standing manner.

The recognition process by the image processing section 304 is the same as that explained employing FIG. 5 and FIG. 6. Thus, explanation for the recognition process of the image processing section 304 is omitted.

Although a case where a step is provided in the floor face 305 so as to obtain facial images of low height persons and high height persons is explained in this twelfth embodiment, the invention is not limited to this, and the invention can be realized by providing a slope in the floor face 305 to stop a person by markers at predetermined positions so that facial images are inputted.

In a case of a structure wherein the information input device 303 senses not the wireless card reader but only a visit of a human recognition object 100, R, L, D in FIG. 30 may be set to distances at which the human recognition object 100 can operate a device such as a button, a keyboard, a mouse, or the like which is not shown through which ID code information is inputted.

Although the case where a visit of a person is automatically sensed by a wireless card reader or the like to start facial image recognition is explained, the invention is not limited to this, and facial image recognition may be started employing other input means such as a button, a keyboard, a mouse, or the like.

Next, a thirteenth embodiment is explained.

Figure 33:
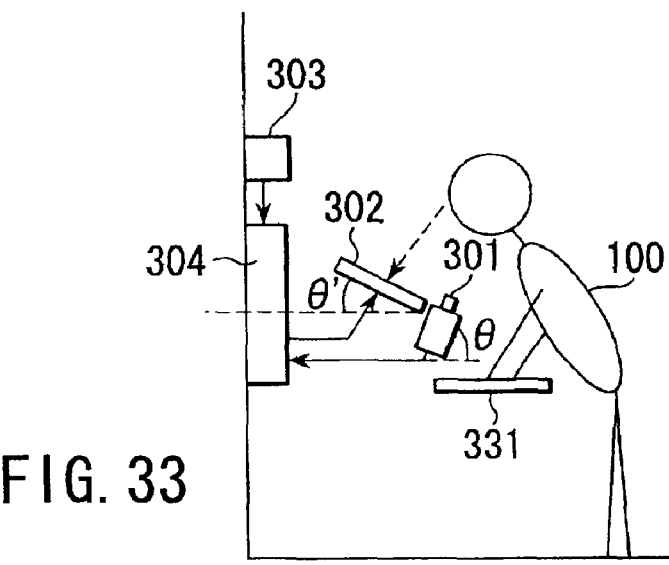
FIG. 33 is a block diagram schematically showing the structure of a facial image recognition apparatus according to a thirteenth embodiment.

FIG. 33 schematically shows the structure of a facial image recognition apparatus according to the thirteenth embodiment. This facial image recognition apparatus has a camera 301, a monitor 302, an information input device 303, an image processing section 304, and a hand support stand 331 as a posture guide by which the hands of a human recognition object 100 are supported in a state wherein he is bending the lower back. The facial image recognition apparatus shown in FIG. 33 differs from the facial image recognition apparatus shown in FIG. 30 described above in an arrange condition of the camera 301 and the monitor 302 and in the point that the hand support stand 331 exists. The facial image recognition apparatus shown in FIG. 33 and the facial image recognition apparatus shown in FIG. 30 described above have the same structures regarding the camera 301, the monitor 302, the information input device 303, and the image processing section 304. Thus, explanation for the same structures as those of the facial image recognition apparatus shown in FIG. 30 is omitted.

In the twelfth embodiment, things are arranged so as to obtain facial images while human recognition objects 100 having various height differences posture in a naturally standing manner. On the other hand, in the present thirteenth embodiment, the camera 301 and the monitor 302 are arranged in lower positions than a height of the human recognition object 100, and human recognition objects 100 having various height differences bring their faces closer to the monitor 302 while bending their lower back so that their faces enter the inside of the photographing region of the camera 301, whereby face recognition can be performed without causing encumbrance on the human recognition objects 100.

For example, when arrangement heights of the camera 301 and the monitor 302 from the floor face are set to approximately 80 to 120 cm, a human recognition object 100 with a height of 140 cm or more can bring his face closer to the camera 301 and the monitor 302 without overextending himself.

As shown in FIG. 33, a tilt angle θ of the camera 301 is made sharp to be installed in a considerably upward direction, and a tilt angle θ' of the monitor 302 is set moderately. The tilt angle θ' of the monitor 302 is about a degree in which a human recognition object 100 can look at the monitor 302 from the upward without overextending himself and is set about 0 to 45.degree. The tilt angle θ of the camera 301 is about a degree in which the facial image of the human recognition object 100 can be inputted when the human recognition object 100 looks at the monitor 302 at the time of the monitor tilt angle θ' and is set about 60 to 90.degree.

Thus, when the human recognition object looks at the monitor 302 from the upward without overextending himself, both hands are supported by the hand support stand 331 so that encumbrance on the lower back of the human recognition object 100 is eliminated.

Figure 34:
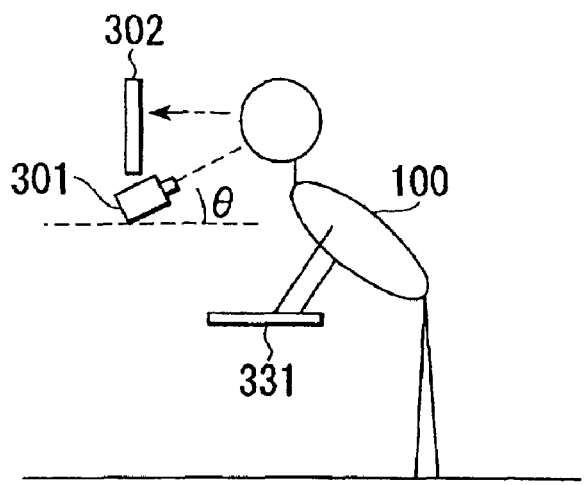
FIG. 34 is an arrangement view of a bad example of a case where a person is encumbered.

As shown in FIG. 34, even in a similar arrangement in which the human recognition object 100 bends the lower back, when the tilt angle θ' of the monitor 302 is sharp, since encumbrance is given to the neck of the human recognition object 100, this type of arrangement is not appropriate.

Next, a fourteenth embodiment is explained.

Figure 35:
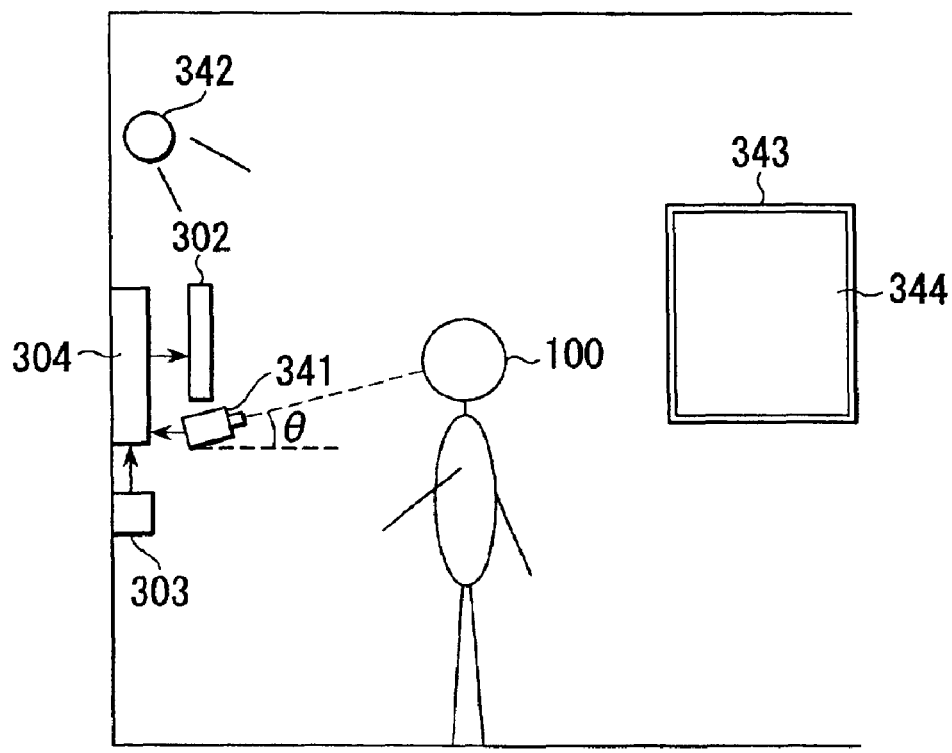
FIG. 35 is a block diagram schematically showing the structure of a facial image recognition apparatus according to a fourteenth embodiment.

FIG. 35 schematically shows the structure of a facial image recognition apparatus according to the fourteenth embodiment.

This facial image recognition apparatus has a monitor 302, an information input device 303, an image processing section 304, an infrared camera 341, an infrared illumination lamp 342, and an infrared light interruption body 344. Since the monitor 302, the information input device 303, and the image processing section 304 have the same structures as those of the twelfth embodiment described above, their explanation is omitted.

The infrared camera 341 is a camera having a sensitivity only in an infrared wavelength region. The infrared illumination lamp 342 illuminates a facial part of a human recognition object 100 by the light in an infrared wavelength region. The infrared light interruption body 344 interrupts natural light in an infrared wavelength region.

In general, the brightness of a facial image photographed by an image input device such as a camera is changed by an illumination light for image input that is a component of an image input means, natural light such as solar light, and an illumination light such as an indoor illumination lamp. Specifically, an illumination light due to natural light and an indoor illumination lamp is called the outer light and is differentiated from the illumination light for image input. In order to secure the performance of facial image recognition, it is necessary to restrict the brightness of a facial image inputted within a tolerance with respect to the brightness of the facial image employed at a registration (dictionary formation) time. That is, in order to secure a high recognition rate, it is necessary to reduce the influence of the outer light.

Figure 36:
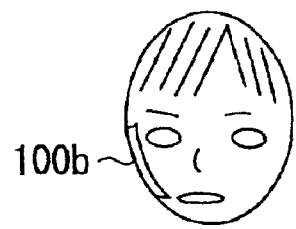
FIG. 36 is a drawing for explaining one example of an uneven illumination due to an outer light.

For example, an installation place of a fluorescent lamp for general illumination such as a ceiling lamp is generally fixed. On the other hand, the direction and the brightness of illumination of solar light are different from morning till evening. Accordingly, although an entire face is illuminated by solar light at a time, there is a case where only one side 100b of the face is illuminated as shown in FIG. 36 at another time. Further, there is a case where a facial image is close to a saturated state and becomes whitish at a time or is dark at a cloudy time.

Figure 37:
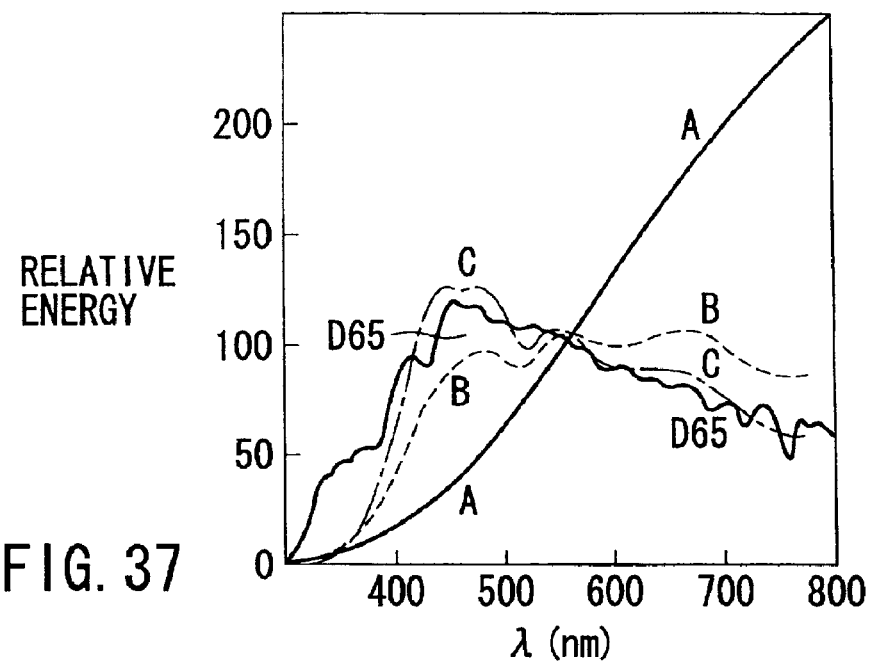
FIG. 37 is a characteristic view showing a spectral distribution of solar light.
Figure 38:
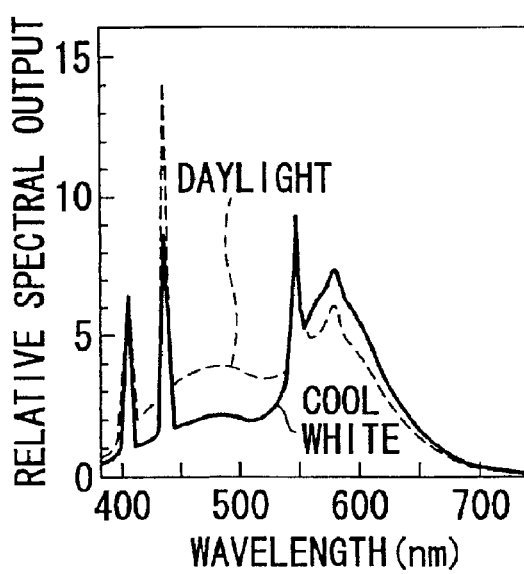
FIG. 38 is a characteristic view showing spectral distributions of cool white and daylight fluorescent lamps.
Figure 39:
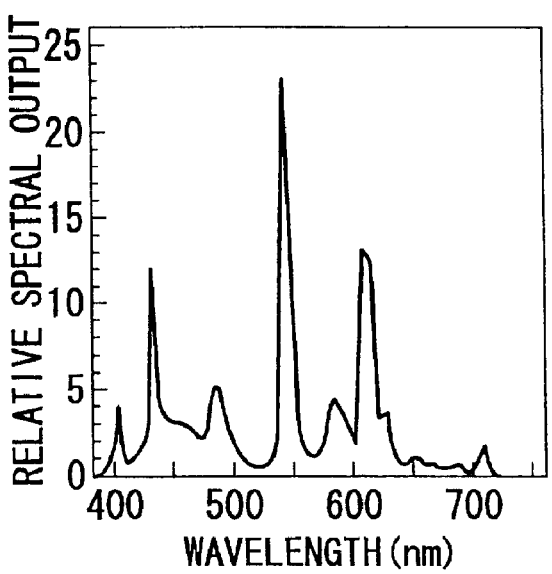
FIG. 39 is a characteristic view showing a spectral distribution of a three-wavelength fluorescent lamp.

Here, one example of a spectral distribution of solar light is shown in FIG. 37. FIG. 38 and FIG. 39 show examples of spectral distributions in fluorescent lamps for illumination that are generally popularly used. FIG. 38 shows an example of spectral distributions in cool white and daylight fluorescent lamps as fluorescent lamps for illumination that are generally used. FIG. 39 shows an example of a spectral distribution in a three-wavelength fluorescent lamp as a fluorescent lamp for illumination that is generally used.

In FIG. 37, a standard light A shows a relative spectral distribution of a light corresponding to the light that a black body whose absolute temperature is about 285.degree. K radiates. A standard light B shows a relative spectral distribution of a light corresponding to a direct solar light whose correlated color temperature is about 4874.degree. K. A standard light C shows a relative spectral distribution of a light corresponding to a mean solar light whose correlated color temperature is about 6774.degree. K. A standard light D shows a relative spectral distribution of a light corresponding to a daylight whose correlated color temperature is about 6504.degree. K. Thus, solar light has a considerable radiation energy even in a near infrared wavelength region of 700 nm or more. On the other hand, with respect to the spectral distributions of fluorescent lamps shown in FIG. 38 and FIG. 39, its radiation energy is close to about "0" in a near infrared wavelength region of 700 nm or more.

In this fourteenth embodiment, the influence of the outer light is reduced employing the above described spectral distribution characteristics. When an infrared camera 341 having a sensitivity from 700 nm or more is employed, it becomes possible to almost completely eliminate the influence of the outer light due to a fluorescent lamp for general illumination. With respect to the influence of the outer light due to solar light, it is prevented to radiate solar light in an infrared wavelength region to the face of a human recognition object 100.

That is, when the facial image recognition apparatus according to the fourteenth embodiment is installed inside a room, in order that a wavelength component of 700 nm or more of solar light (natural light) is not radiated from the outdoor, the infrared light interruption body 344 made of a film or sheet with an infrared cut characteristic may be attached on a window 343, or a piece of glass with an infrared cut characteristic may be attached to the window 343. With this, regarding solar light entering through the window 343, only solar light component of an infrared wavelength is removed, and a visible light component is passed, whereby a sense of incongruity is not given to a person.

The image of the infrared camera 341 having a sensitivity from 700 nm or more becomes darker due to the infrared light interruption body 344. Therefore, the face of a human recognition object 100 photographed by the infrared camera 341 is radiated by the infrared illumination lamp 342 at a certain level of brightness.

By eliminating the influence of the outer light, a facial image can be inputted while outer illumination factors is nearly eliminated, and recognition performance of a facial image can be improved.

The facial image recognition apparatuses explained in the twelfth embodiment, the thirteenth embodiment, and the fourteenth embodiment can be applied, for example, to the pass control apparatuses as shown in FIG. 23, FIG. 26, FIG. 27, FIG. 28, and FIG. 29. Further, in the facial image recognition apparatuses explained in the twelfth embodiment, the thirteenth embodiment, and the fourteenth embodiment, it is possible that the device for registration and the device for collation are separately provided, for example, as shown in FIG. 15 or FIG. 16.

It is possible that the first to fourteenth embodiments are variously combined to be implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A facial image recognition apparatus comprising:
a plurality of illumination units each of which radiates light from a different direction toward the entire face of a human recognition object,
a motion picture camera which photographs a facial image of the human recognition object toward which the light from the plurality of illumination units is radiated,
a feature value extraction section which extracts a feature value of the face of the human recognition object from a facial image photographed by the motion picture camera, and
a recognition section which collates the feature value extracted by the feature value extraction section with a standard feature value registered in advance so as to recognize a facial image of the human recognition object.

2. The facial image recognition apparatus as set forth in claim 1, said plurality of illumination units including a first illumination unit which illuminates light toward the entire face of the human recognition object and a second illumination unit which illuminates light toward the entire face of the human recognition object from a direction different from a direction from which the first illumination unit radiates light, wherein the illuminance of the light radiated from the first illumination unit is greater than that of the light radiated from the second illumination unit.

3. The facial image recognition apparatus as set forth in claim 1, said plurality of illumination units including a first illumination unit which illuminates light toward the entire face of the human recognition object and a second illumination unit which illuminates light toward the entire face of the human recognition object from a direction different from a direction from which the first illumination unit radiates light, wherein the total value of the illuminance of the light radiated from the first illumination unit and the illuminance of the light radiated from the second illumination unit is greater than the illuminance of the light other than the light from the first and second illumination units radiated to the human recognition object.

4. The facial image recognition apparatus as set forth in claim 1, further comprising an information input section which inputs information related to the human recognition object, wherein the recognition section searches a feature value corresponding to the information inputted by the information input section from the standard feature value registered in advance and collates the searched feature value with the feature value extracted by the feature value extraction section so as to recognize a facial image of the human recognition object.

5. The facial image recognition apparatus as set forth in claim 1, further comprising an outer light interruption section which inputs light other than the light from the plurality of illuminations radiated to a facial part of the human recognition object.

6. The facial image recognition apparatus as set forth in claim 1, further comprising a display section which displays the facial image photographed by the motion picture camera and displaying information showing an appropriate size of a facial image.

7. The facial image recognition apparatus as set forth in claim 1, said plurality of illumination units including a first illumination unit which illuminates light toward the entire face of the human recognition object and a second illumination unit which illuminates light toward the entire face of the human recognition object from a direction different from a direction from which the first illumination unit radiates light, wherein
the first illumination unit is installed in a front right diagonal part or a front left diagonal part of the motion picture camera, taken in the direction that the human recognition object looks, and
the motion picture camera is installed below a position of the face of the human recognition object so as to photograph a facial image of the human recognition object in an upward direction.

8. The facial image recognition apparatus as set forth in claim 1, wherein
the plurality of illumination units sequentially operate in a predetermined order and time interval,
the motion picture camera photographs facial images of the human recognition object one after another by synchronizing sequential operations of the plurality of illumination units,
the feature value extraction section extracts feature values of the face of the human recognition object from a plurality of facial images sequentially inputted from the motion picture camera, respectively, and
the recognition section collates a plurality of feature values extracted by the feature value extraction section with a standard feature value registered in advance, respectively, so as to recognize a facial image of the human recognition object.

9. The facial image recognition apparatus as set forth in claim 8, further comprising a registration section configured to register the plurality of feature values extracted by the feature value extraction section as standard feature values, respectively, at a time of registration of a facial image, wherein the recognition section collates a plurality of feature values extracted by the feature value extraction section with a plurality of standard feature values registered by the registration section, respectively, at a time of collation of a facial image, so as to recognize a facial image of the human recognition object.

10. A facial image recognition apparatus comprising a facial image registration section for performing registration processing of a facial image and a facial image recognition section connected to the facial image registration section to perform recognition processing of a facial image, wherein the facial image registration section comprises a plurality of first illumination units each of which radiates light from a different direction toward the entire face of a human recognition object, a first motion picture camera for photographing a facial image of the human registration object, a first feature value extraction section for extracting a feature value of the face of the human registration object from a facial image photographed by the first motion picture camera, and a memory section for storing a feature value extracted by the first feature value extraction section as a standard feature value, and the facial image recognition section comprises a plurality of second illumination units each of which radiates light from a different direction toward the entire face of the human recognition object, a second motion picture camera which photographs a facial image of the human recognition object, a second feature value extraction section which extracts a feature value of the face of the human recognition object from a facial image photographed by the second motion picture camera, and a recognition section which collates a feature value extracted by the second feature value extraction section with a feature value stored in the memory section of the facial image registration section so as to recognize a facial image of the human recognition object.

11. The facial image recognition apparatus as set forth in claim 10, wherein the facial image registration section further comprises a first display section a facial image photographed by the first motion picture camera, and the facial image recognition section further comprises a second display section a facial image photographed by the second motion picture camera.

12. A facial image recognition apparatus comprising a motion picture camera installed so that a human recognition object positions oneself on a floor face having at least one or more differences in elevation and photographing a facial image of the human recognition object positioning oneself on a floor face of a height according to the height of the human recognition object, a display section which displays a facial image of the human recognition object photographed by the motion picture camera, a feature value extraction section which extracts a feature value of the face of the human recognition object from a facial image photographed by the motion picture camera, and a recognition section which collates the feature value extracted by the feature value extraction section with a standard feature value registered in advance so as to recognize a facial image of the human recognition object.

13. The facial image recognition apparatus as set forth in claim 12, further comprising an information input section which inputs information related to the human recognition object, wherein the recognition section searches a feature value corresponding to the information inputted by the information input section from the standard feature value registered in advance and collates the searched feature value with the feature value extracted by the feature value extraction section so as to recognize a facial image of the human recognition object.

14. The facial image recognition apparatus as set forth in claim 12, further comprising a posture guide which supports a hand in a state wherein the human recognition object bends one's lower back, wherein the motion picture camera photographs in an upward direction a facial image of the human recognition object in a posture in which one's hand is supported by the posture guide.

15. The facial image recognition apparatus as set forth in claim 12, further comprising a posture guide a hand in a state wherein the human recognition object bends one's lower back, wherein the motion picture camera photographs in an upward direction a facial image of the human recognition object in a posture in which one's hand is supported by the posture guide, and the display section is installed so that the human recognition object can look at a display screen in a state wherein the face of the human recognition object whose hand is supported by the posture guide faces downward.

16. The facial image recognition apparatus as set forth in claim 15, wherein the display section is installed so that an angle of the display screen displayed for the human recognition object with respect to the floor face becomes more obtuse than the angle of the photographing direction of the motion picture camera with respect to the floor face.

17. The facial image recognition apparatus as set forth in claim 12, further comprising an infrared light interruption section which interrupts an infrared wavelength region of natural light, wherein the motion picture camera has a sensitivity only in the infrared wavelength region and photographs a facial image of the human recognition object in a state wherein an infrared wavelength region of the outer light is interrupted by the infrared light interruption section.

18. The facial image recognition apparatus as set forth in claim 17, further comprising an infrared illumination which radiates light in an infrared wavelength region toward the human recognition object.

* * * * *